United States Patent
Freed

(10) Patent No.: US 9,030,419 B1
(45) Date of Patent: May 12, 2015

(54) TOUCH AND FORCE USER INTERFACE NAVIGATION

(75) Inventor: Ian W. Freed, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1169 days.

(21) Appl. No.: 12/892,405

(22) Filed: Sep. 28, 2010

(51) Int. Cl.
G06F 3/041 (2006.01)
G06F 3/048 (2013.01)
G06F 3/0488 (2013.01)

(52) U.S. Cl.
CPC ............ *G06F 3/0416* (2013.01); *G06F 3/0488* (2013.01)

(58) Field of Classification Search
CPC ............. G06F 3/04883; G06F 3/0488; G06F 2203/04808; G06F 3/044; G06F 3/041; G06F 3/0485; G06F 3/04886; G06F 2203/04101; G06F 2203/04104; G06F 3/0235; G06F 3/0412; G06F 3/04815; G06F 3/04845; G06F 3/016; G06F 2203/04109; G06F 3/011; G06F 3/0425; G06F 3/0304; G06F 3/017; G06F 1/1626; G06F 2203/013; G06F 3/0312; G06F 3/0346; G06F 3/0428; G09G 2320/0646; G09G 2320/066; G09G 3/3426; G09G 5/10; G09G 2320/0686; G09G 2360/16; G09G 2320/0285; G09G 2320/062; G09G 2320/0693; G09G 2340/045; G09G 2360/144; G06T 2207/20192; G06T 2207/20224; G06T 5/001; G06T 7/0081; G06T 2207/10004; G06T 2207/10032; G06T 2207/10144; G06T 2207/20144; G06T 2207/20216; G06T 3/4038; G06T 11/00; G06T 2200/24

USPC ................................................... 345/156–181
See application file for complete search history.

(56) References Cited

U.S. PATENT DOCUMENTS

| | | | |
|---|---|---|---|
| 2005/0144569 A1* | 6/2005 | Wilcox et al. ................ | 715/822 |
| 2008/0068456 A1* | 3/2008 | Fujii et al. .................... | 348/130 |
| 2009/0064031 A1* | 3/2009 | Bull et al. .................... | 715/784 |
| 2009/0160793 A1* | 6/2009 | Rekimoto ..................... | 345/173 |
| 2009/0295753 A1* | 12/2009 | King et al. .................... | 345/174 |
| 2010/0156813 A1* | 6/2010 | Duarte et al. ................. | 345/173 |
| 2011/0039602 A1* | 2/2011 | McNamara et al. .......... | 455/566 |
| 2011/0134069 A1* | 6/2011 | Shen ............................. | 345/174 |
| 2011/0243397 A1* | 10/2011 | Watkins et al. ............... | 382/118 |

* cited by examiner

Primary Examiner — Duc Dinh
(74) Attorney, Agent, or Firm — Lee & Hayes, PLLC

(57) ABSTRACT

Techniques for navigating through a user interface with a force-sensitive touch sensor are described. In some implementations, the force-sensitive touch sensor is also a display that presents the user interface. Touches on the force-sensitive touch sensor may be interpreted as indicating a vector direction based on the location of the touch and a vector magnitude based on the force of the touch. For instance, when a user navigates through a collection of photographs on a device having a force-sensitive touch sensor, the vector direction may determine if the user is scrolling forwards or backwards through the photographs and the vector magnitude may determine how rapidly the scrolling occurs. The user may also navigate through a hierarchy of folders and files using touch and force. Selection of a folder and application of force exceeding a threshold may result in display of the contents of a most commonly accessed subfolder or file.

33 Claims, 16 Drawing Sheets

TOUCH AND FORCE USER INTERFACE NAVIGATION

BACKGROUND

A large and growing population of users is enjoying entertainment through the consumption of digital content items (or simply "content items"), such as music, movies, images, electronic books, and so on. The users employ various electronic devices to consume such content items. Among these electronic devices are personal computers, electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying Figures. In the Figures, the left-most digit(s) of a reference number identifies the Figure in which the reference number first appears. The use of the same reference numbers in different Figures indicates similar or identical items or features.

DETAILED DESCRIPTION

Figure 1:
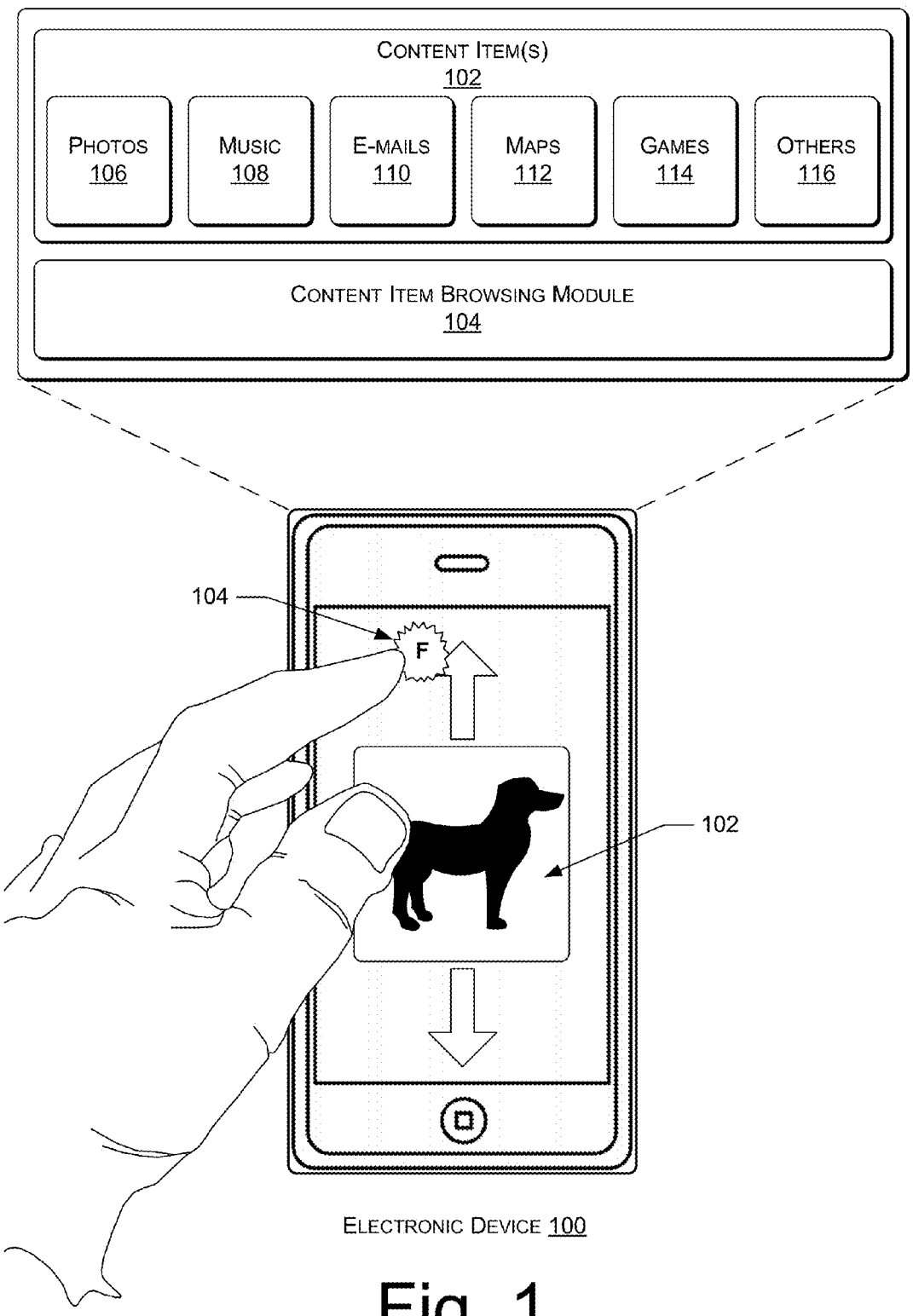
FIG. 1 illustrates an electronic device equipped with a display configured to display content items and a force-sensitive touch sensor configured to receive user input.

This disclosure describes techniques for outputting different content on a display of an electronic device based at least in part on an amount of force applied to a force-sensitive touch sensor. In some implementations, the force-sensitive touch sensor and the display may be combined in a force-sensitive touch-screen display. For instance, when a user is browsing through a collection of photographs, a user interface may display the photographs as a carousel of images and the user may scroll forwards or backwards through the photographs by touching the display. In response, the device may display a photograph from earlier or later in the carousel based on the location of the touch. To scroll through many photographs quickly, the user may touch the display with a greater amount of force. As the user applies increasing amounts of force, the device may proportionally increase a speed of the scrolling. If the photographs are moving across the display very quickly, the images may blur and/or each photograph may be shown for such a brief period of time that the user cannot recognize the photographs as they scroll across the display. The device may compensate for this by showing a subset of the photographs while scrolling at high speed, while refraining from displaying other photos of the set. For example, several photographs may be represented by one representative photograph that is displayed long enough for user to view the representative photograph.

In another example, the device may display information from a contact list or other text-based file. The user may browse through the entries of the contact list by touching the display. The user can also adjust a speed of scrolling through entries in the contact list by changing a force with which he or she presses on the display. Greater force may increase the speed of scrolling. If the speed of the scrolling becomes too rapid, the user may no longer be able to read each entry in the contact list as that entry scrolls across the display. In response, the device may modify the display to show only an abbreviated representation of each entry in the contact list, such as a first letter of a name, when the user scrolls through the list.

This disclosure also describes techniques for interacting with graphical representations of file and folder directory structures. For instance, when a user touches a folder icon on the display of the device, the device may display the contents of a subfolder. The subfolder displayed by the device may be selected based on an amount of force and a number of fingers with which the user touches the folder icon. For instance, the device may display the contents of a most-frequently accessed subfolder when the user touches the folder icon with more than a threshold level of force. As a further example, the device may display file within the most-frequently accessed subfolder when the user touches the folder icon with more than one finger and applies more than the threshold level of force.

This brief introduction is provided for the reader's convenience and is not intended to limit the scope of the claims. The techniques described above and below may be implemented in a number of ways and in a number of contexts. Several example implementations and contexts are provided with reference to the following figures as described below in more detail. However, the following implementations and contexts are but a few of many.

Illustrative Electronic Device

FIG. 1 illustrates an electronic device 100 ("device") capable of displaying a content item 102 and detecting an amount of force 104 when a user touches a force-sensitive touch sensor. The electronic device 100 may be implemented as a mobile telephone, a portable digital assistant (PDA), an electronic book ("eBook") reader device, a portable media player, a tablet computer, a desktop computer, netbook, a notebook computer, a gaming consoles, or any other type of electronic device.

The content item(s) 102 may include any number and combination of different types of content items such as photographs 106, music files 108, e-mails 110, maps 112, games 114, and other content items 116 including videos, contact lists, text documents, spreadsheet documents, and the like. The content item(s) 102 may be available in local memory of the device 100 or may be available to the device over a network. The network that provides the content item(s) 102 may be implemented as any one or combination of multiple different types of networks, such as the Internet, cable networks, cellular networks, wireless networks, and wired networks. One example of a wireless technology and associated protocols is the Wireless Fidelity (WiFi) wireless networking technologies defined according to IEEE 802.11 standards, while another example is a cellular network.

The device 100 may also include a content item browsing module 104 that controls the selection and display of content items 102 selected by the user. The content item browsing module 104 may also the image that is displayed on the device 100 while scrolling through multiple content items 102. Further details of the content browsing module 104 are described below.

Figure 2:
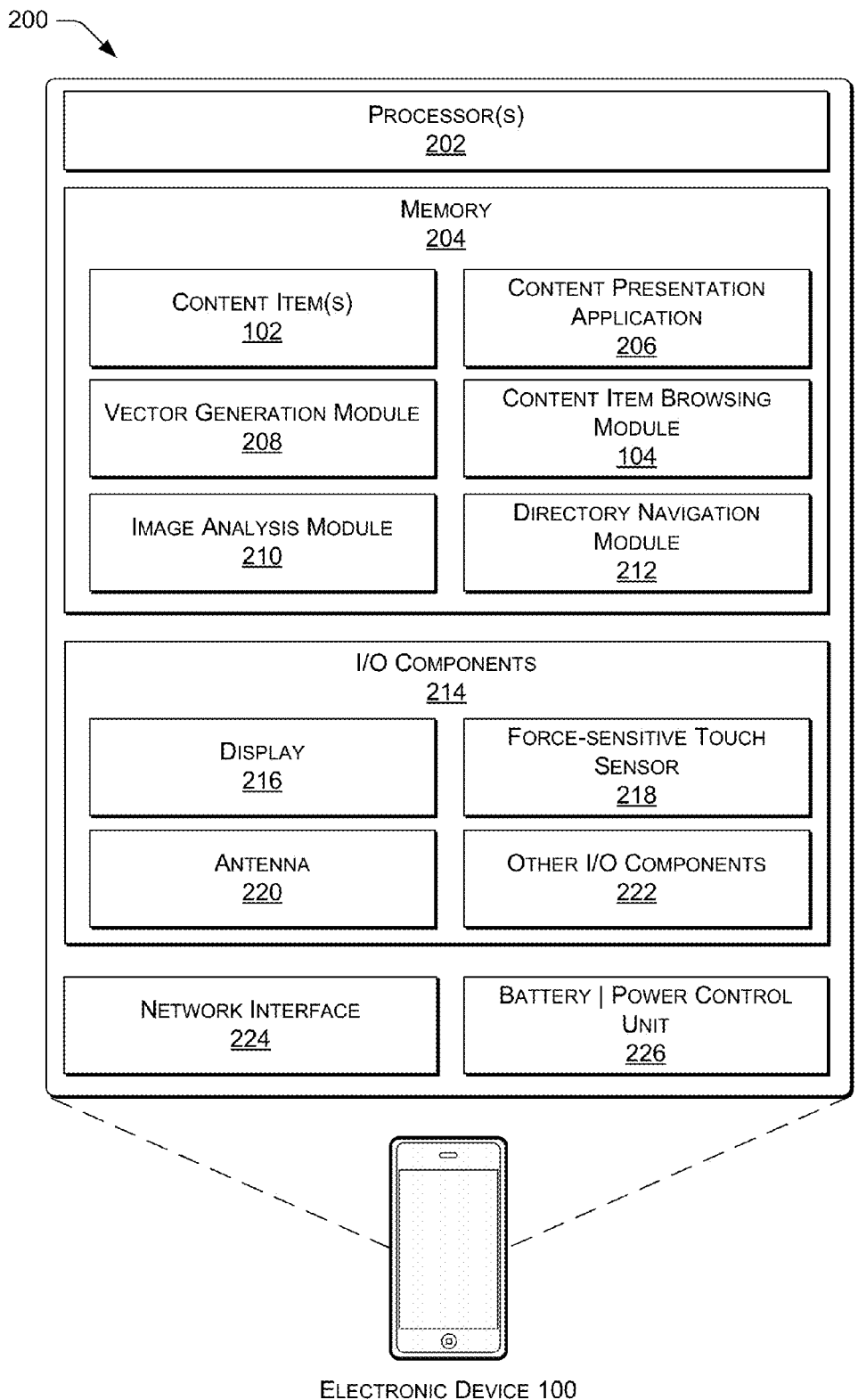
FIG. 2 is a block diagram of selected modules of the electronic device of FIG. 1.

FIG. 2 illustrates a block diagram 200 of example components that might be implemented in the device 100 of FIG. 1. In this example, the device 100 is a portable, wireless device, although other electronic devices may implement these techniques and, hence, may include some of the functionality described herein.

In a very basic configuration, the device 100 includes one or more processors 202 and memory 204. Depending on the configuration of the device 100, the memory 204 is an example of computer-readable media and may include volatile and nonvolatile memory. Thus, the memory 204 may include, but is not limited to, RAM, ROM, EEPROM, flash memory, or other memory technology, or any other medium which can be used to store content items or applications and data which can be accessed by the device 100.

The memory 204 may be used to store any number of functional components that are executable on the processor (s) 202, as well as data and content items 102 that are rendered by the device 100. Thus, the memory 204 may store an operating system, other executable applications, and one or more content items 102.

Content presentation application 206 may be provided in memory 204 and may be executed on the processor(s) 202 to render the content items 102. The content presentation application 206 may be implemented as various applications depending upon the specific content item(s) 102 that is presented. For instance, the content presentation application 206 may be a photo viewer application for rending digital photographs, an audio player for playing audio books or songs, a video player for playing videos, and so forth.

A vector generation module 208 generates vectors based upon touch input received by the device 100. The position and force of a touch may be interpreted by the vector generation module 208 as a vector having a direction indicated by the position of the touch and a magnitude indicated by the force of the touch. Additional aspects of vector generation are described in conjunction with FIGS. 3 and 4.

A content item browsing module 104 changes a content item 102 displayed by the device 100. The content item browsing module 104 receives an indication that the force-sensitive touch sensor 218 has detected a user input having a location of a touch and an amount of force of the touch. Responsive to this input, the content item browsing module 104 may cause a content item 102 in an ordered series of content items that is displayed on the display 216 to be replaced by another content item 102 in the ordered series of content items.

For example, replacing the one content item 102 with another on the display may appear to the user as browsing forwards or backwards through a series of content items 102. The content item browsing module 104 may cause the device 100 to scroll forwards or backwards through the ordered series of content item based on the location of the user input at a speed that is based on the amount of force of the user input. The direction of the scrolling may determine if the content item 102 is replaced by a previous or a subsequent content item 102 in the ordered series of content items. For example, a touch on the right-hand side of the force-sensitive touch sensor 218 may be interpreted as a command to display a subsequent content item 102 and conversely a touch on the left-hand side may be interpreted as a command to go "backwards" and display a previous content item.

The speed of advancing forwards or backwards through the ordered series of content items may be regulated by the amount of force applied to the force-sensitive touch sensor 218. A strong touch may cause the content item browsing module 104 change the displayed content item 120 more rapidly than a soft touch. The content item browsing module 104 may also identify an appropriate image to output on the display 118 while in the process of scrolling between content items 102. During interactions in which displaying all intervening content items 102 may be difficult to see because of the speed at which the content items 102 are scrolling, the content item browsing module 104 may cause the device 100 to display an abbreviated representation of one or more content items 102 or to display a single representative content item in place of multiple content items 102. The content item browsing module 104 may select every $n^{th}$ content item to display. For example, when a user is scrolling at relatively fast speeds the content item browsing module 104 may cause the device to display every $10^{th}$ photograph. The number of content items that are not displayed (i.e., the value of "n") may increase as the scrolling speed increases.

An image analysis module 210 may identify a representative image or images from a group of similar images. The image analysis module 210 may determine that several photographs are part of a same group by tags or metadata associated with the photographs or by analyzing a visual similarity of multiple photographs to determine which ones are related. The image analysis module 210 may use computer vision processing techniques such as algorithms for face recognition, scene recognition, and the like. For example, the device 100 may have access to several photographs that are similar such as multiple photographs of a child swinging a bat at a ball. When the user is browsing through the photographs have high speed, the image analysis module 210 may select one of the photographs of the child as a representative image. This one representative image may be displayed rather than each of the several similar images of the child. The selection performed by the image analysis module 210 may also analyze the clarity and contrast of the photographs so that a blurry or under/over exposed photograph is not selected as the representative image.

A directory navigation module 212 processes touch input from the user and enables the user to navigate through a display hierarchy of folders and files based on the touch input. When the user touches a folder icon displayed by the device 100, the device 100 may next display a subfolder or open a file within the folder depending on the type of touch input received. Determinations of a level of force with which the user touches the folder icon and a number of fingers used by the user may be interpreted by the directory navigation module 212 as corresponding to multiple different directory-navigation commands. Further aspects of directory navigation are discussed in conjunction with FIG. 14.

FIG. 2 further illustrates that the device 100 may be equipped with various input/output (I/O) components 214. Such components may components such as a display, speakers, a haptic vibration generator, and the like. Input components may include various user interface controls (e.g., buttons, a joystick, a keyboard, etc.), a touch sensor, connection ports, and so forth.

The device 100 may include a display 216, which may be a passive, emissive or any other form of display. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs.

The device 100 may also include one or more force-sensitive touch sensors 218. This sensor 218 may be implemented as an interpolating force-sensitive resistance (IFSR) array that uses force-sensitive resistors which become more conductive as a user applies increasing levels of pressure to the touch sensor. In some implementations, the force-sensitive touch sensor 218 may be combined with the display 216 to form a touch-screen display that is force-sensitive.

Additional I/O components 214 of the device 100 may include an antenna 220 for sending and receiving wireless signals as well as any other suitable I/O component 222 such as an accelerometer or gyroscope for detecting an orientation or movement of the device 100.

A network interface 224 in the device 100 supports both wired and wireless connection to various networks, such as cellular networks, radio, WiFi networks, short range networks (e.g., Bluetooth), IR, and so forth. The network interface 224 may communicate in part using the antenna 220 and may allow a user of the device 100 to download content items 102 from a network.

The device 100, particularly in mobile or portable implementations, may also include a battery and power control unit 226. The battery and power control unit operatively controls an amount of power, or electrical energy, consumed by the device 100. Actively controlling the amount of power consumed by the device 100 may achieve more efficient use of electrical energy stored by the battery.

The device 100 may have additional features or functionality. For example, the device 100 may also include additional data storage devices (removable and/or non-removable) such as, for example, magnetic disks, optical disks, or tape. The additional data storage media may include volatile and non-volatile, removable and non-removable media implemented in any method or technology for storage of information, such as computer readable instructions, data structures, program modules, or other data.

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Illustrative User Interfaces

FIGS. 3-14 illustrate example user interfaces that the device 100 may render in accordance with the techniques described herein. While these Figures illustrates a few example interfaces it is to be appreciated that numerous other types of interfaces providing numerous other types of navigation and user interface interactions may be implemented using the described techniques.

Figure 3:
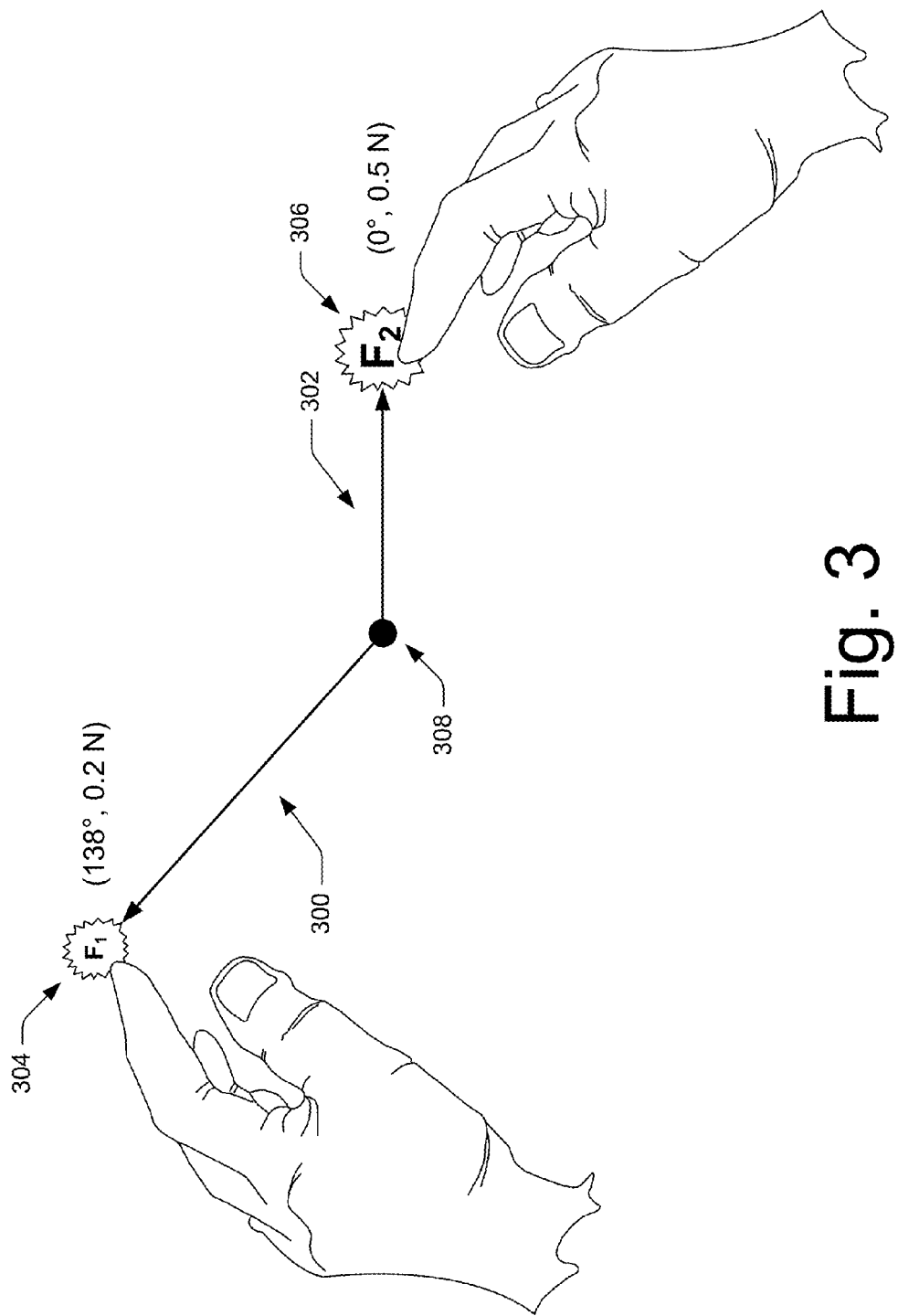
FIG. 3 illustrates a user interface showing interpretation of user input on the force-sensitive touch sensor as vectors having a direction and a magnitude.

FIG. 3 illustrates the device 100 generating vectors 300 and 302 based on touches on a force-sensitive touch sensor 218. The vectors 300 and 302 may be generated by the vector generation module 208 of FIG. 2. Here, the user may touch the force-sensitive touch sensor 218 in a first location 304. The user may simultaneously or sequentially also touch the force-sensitive touch sensor 218 at a second location 306. The level of force generated against the surface of the force-sensitive touch sensor 218 may be different for each touch. The touch at the first location 304 is shown as having a lower level of force $F_1$ and the touch at the second location 306 is shown as having a higher level of force $F_2$. The direction of each vector 300 and 302 may be determined by comparing a location of the respective touch 304 and 306 to a reference location 308. The reference location 308 may be located anywhere on the force-sensitive touch sensor 218 or it may be a "virtual" location somewhere beyond the boundaries of the sensor 218. The reference location 308 may be the center of the force-sensitive touch sensor 218. The e direction of the vector 300 and 302 may be a direction of a line from the reference location 308 to a location of the touch 304 or 306. The vector direction may be represented as an angular measure of the line between the reference location 308 and the location of the touch 304, 306. For example, the direction of the first vector 300 may be 138° and the direction of the second vector 302 may be 0°.

Each vector 300 and 302 also has a magnitude that may be determined by the force of the respective touch 304 and 306. Here, the second vector 302 has a larger magnitude than the first vector 300 because the amount of force applied by the touch that location 306 is greater than the force applied by the touch at location 304. For example, the first vector 300 may have a magnitude that corresponds to 0.2 N of force and the second vector 302 may have a magnitude that corresponds to 0.5 N of force. FIG. 3 shows the location of the touch 306 as being relatively closer to the reference location 308 than the touch 304. However, in implementations in which the magnitude of detected force is used to determine the magnitude of a vector, a shorter line (i.e., the distance between 308 and 306) may actually have a larger magnitude than a longer line (e.g., the distance between 308 and 304). Thus, a user may control vector magnitude by adjusting the force with which he or she presses on the force-sensitive touch sensor 218 rather than by how far away he or she presses from the reference location 308. Each vector 300 and 302 may therefore have two components: a direction which may be an angle and a magnitude which may be a measure of force.

In other implementations, the distance between the location of the touch 304 or 306 and the reference location 308 may provide the magnitude for the respective vectors. In this implementation, each touch on the force-sensitive touch sensor 218 may be interpreted by the vector generation module 208 as having an angular position and a length relative to the reference location 308. This representation of touch location may be processed as polar coordinates or it may be converted to Cartesian coordinates. The magnitude of force is therefore available to provide a third degree of freedom that may be interpreted by the vector generation module 208 as a Z-axis component perpendicular to the surface of the force-sensitive touch sensor 218.

Figure 4:
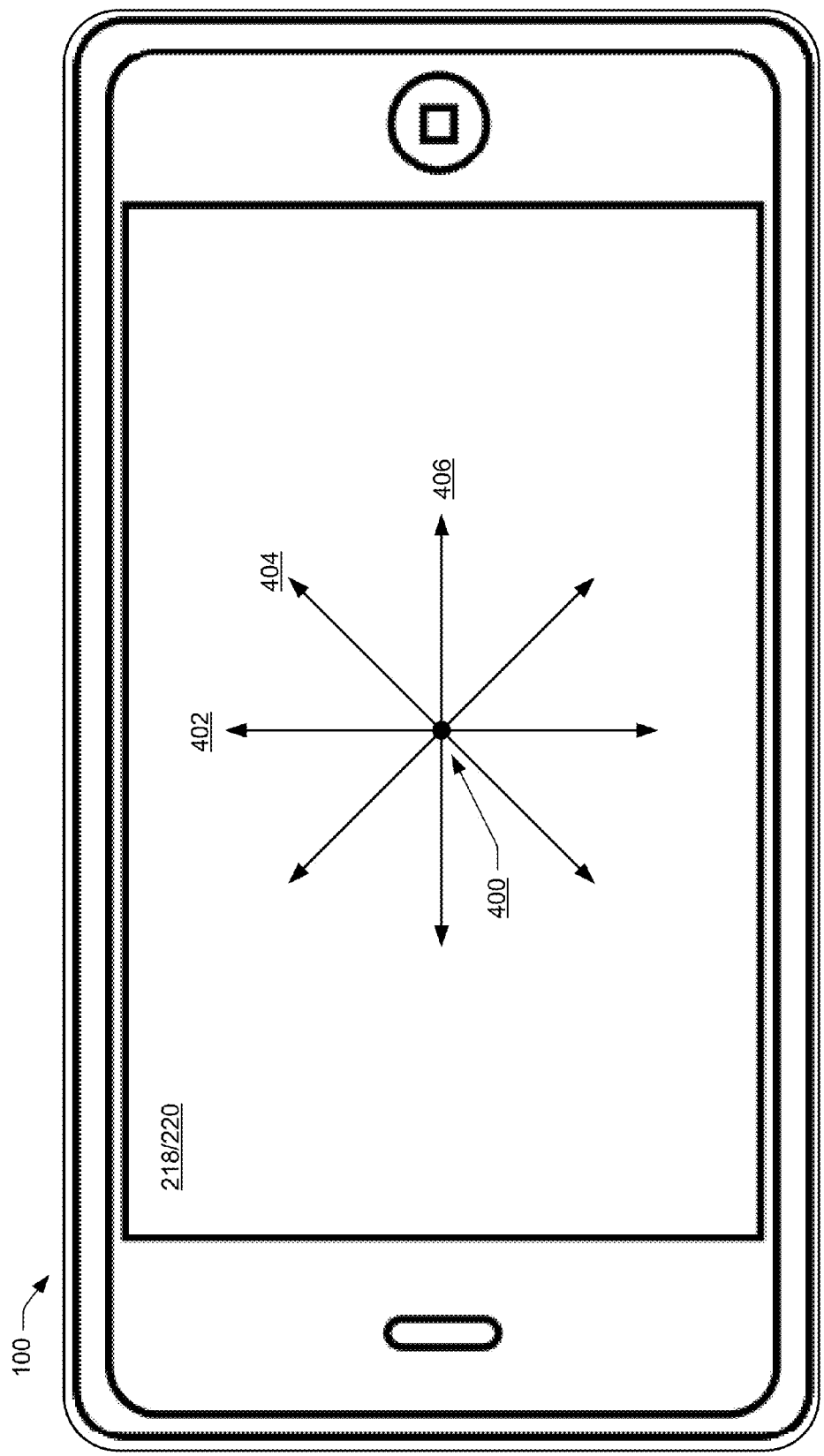
FIG. 4 illustrates an example user interface of the electronic device of FIGS. 1 and 2 showing possible vectors relative to a force-sensitive touch-screen display.

FIG. 4 illustrates an example user interface of the device 100 implemented as a mobile telephone having an integrated force-sensitive touch-screen display 216/218. However, other implementations of the device 100 and arrangements of the force-sensitive touch sensor 218 and the display 216 are also possible. Here, a reference location 400 shown in the middle of the touch-screen 216/218. A plurality of vectors radiate from the reference location 400. Although the vectors are shown in FIG. 4, the device 100 may use the vectors only for input processing and may not show the vectors on the display 216. In other implementations, the vectors may transiently appear on the display 216 to provide the user with feedback or confirmation regarding where and how hard he or she has touched the force-sensitive touch sensor 218.

The vectors shown here radiate from the reference location 400 in the eight primary compass directions north, northwest, west, etc. However, the number of angular vector positions may be 360, representing each degree in a circle, or more depending on the sensitivity of force-sensitive touch sensor 218. Depending on the particular user interface, discrimination between vector directions may be reduced so that all the vectors pointing in generally the same direction are interpreted in a similar manner. For example, vector 402 and vector 404 both point "up." Vector 402 may be interpreted as pointing north or at 90°. Vector 404 may be interpreted as pointing northwest or at 45°. Since both of these vectors 402 and 404 have a "northward" or "up" component they may be interpreted as pointing the same direction. Similarly, vector 404 and vector 406 each have a "westward" or "right" component so these two vectors may both be interpreted as pointing to the right.

The orientations described above, north, up, etc., are relative orientations based on the orientation of the device 100 as shown in FIG. 4. When the device 100 is capable of being rotated like a mobile or portable device, a sensor in the device 100 such as an accelerometer may determine an orientation of the device 100. Thus, the orientation of "up" may change as the user moves or rotates the device 100. Ultimately the vector generation module 208 and/or other components of the device 100 will determine a correlation between a vector direction and an input command to be provided to other applications or components of the device 100.

Figure 5:
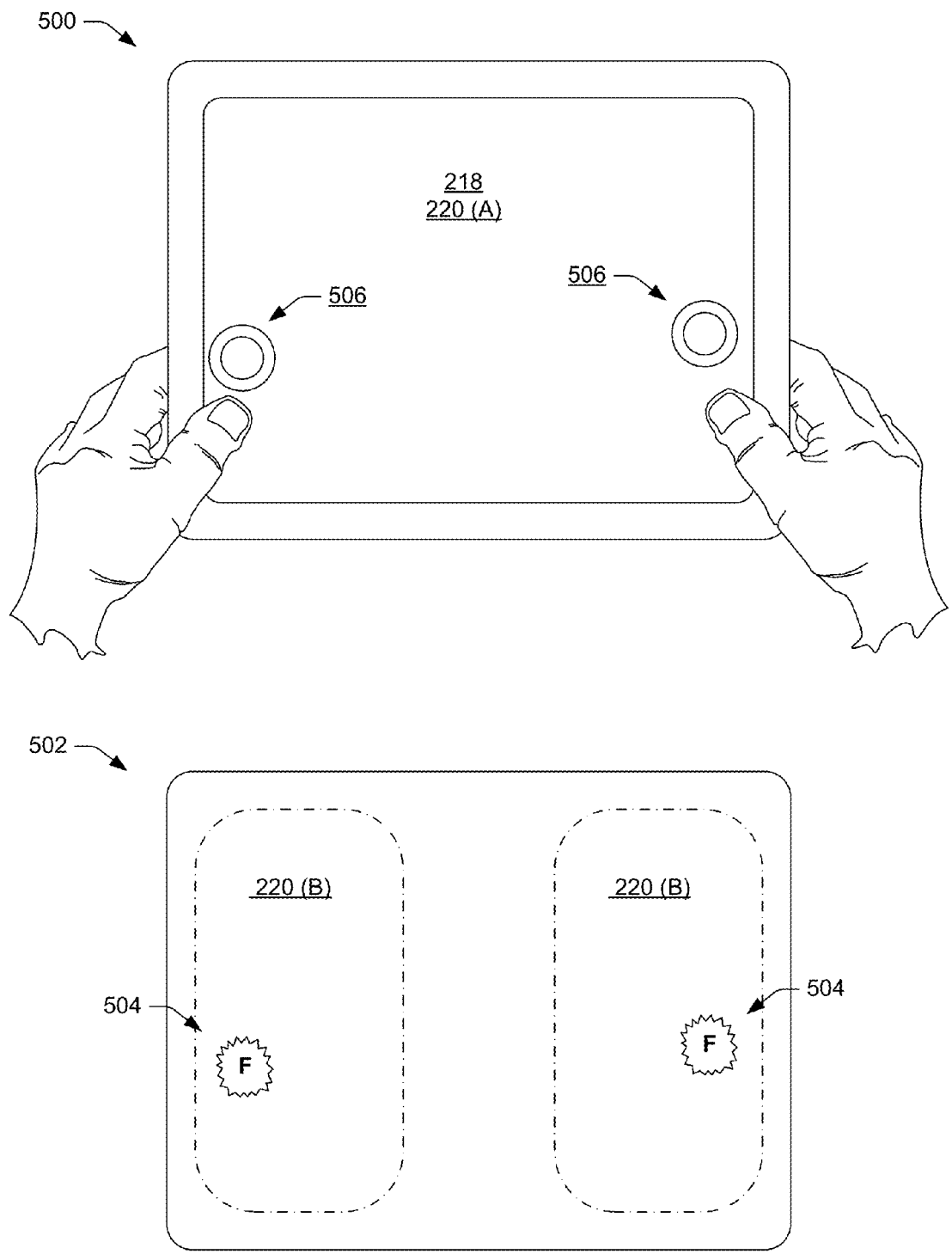
FIG. 5 illustrates an electronic device implemented as a tablet device. Here, the device has a display on the front and a force-sensitive touch sensor located on the back.

FIG. 5 illustrates a tablet device 500 that has a different form factor but may otherwise be analogous to the electronic device 100 shown in FIG. 1. The tablet device 500 has a display 216 on a front surface. The display may include a force-sensitive touch sensor 218(A). A back 502 of the tablet device 500 may also include one or more force-sensitive touch sensors 218(B). The back-mounted touch sensor(s) 218(B) may be in addition or instead of the force-sensitive touch sensor 218(A) integrated into the display 216. The back-mounted sensor(s) 218(B) may detect locations of force 504 from the user pressing on the back 502 of the tablet device 500 with, for example, an index finger. The tablet device 500, or the electronic device 100 in any form factor, may also include force-sensitive touch sensors 218(B) on a side of the device as well as on the front and/or back.

The sensor(s) 218(B) on the back 502 of the tablet device 500, may allow the user to activate the sensor(s) 218(B) without obscuring the display 216. When the user activates the sensor(s) 202(B), the display 216 may show a cursor 506 such as a "halo" in a location that corresponds to the position where force was detected on the back 502. In some implementations, a size of the cursor 506 may increase proportionally to the amount of force applied on the sensor(s) 218(B). In other implementations the size of the halo may change when the amount of applied force exceeds a threshold such as the thresholds discussed below in FIGS. 6-9. Other visual indications may also signal to the user that the amount of force he or she is applying is near or at a threshold. For example, text may appear near the location of the touch describing a recently crossed threshold (e.g., "This is 'medium' force.") a color of the halo, or other marker, may change and the like. Similarly a haptic or audio indication may also signal to the user that the level of applied force has recently crossed over, or is nearing, a threshold level.

Using a sensor 218(B) that is not part of the display 216 may provide an analogous user interface experience to directly touching the display 216. Aspects of this disclosure that are described as being implemented with a force-sensitive touch screen display 216/218 may also be implemented with a force-sensitive touch sensor 218(B) located elsewhere on the electronic device 100 or configured as an additional input device.

Figure 6:
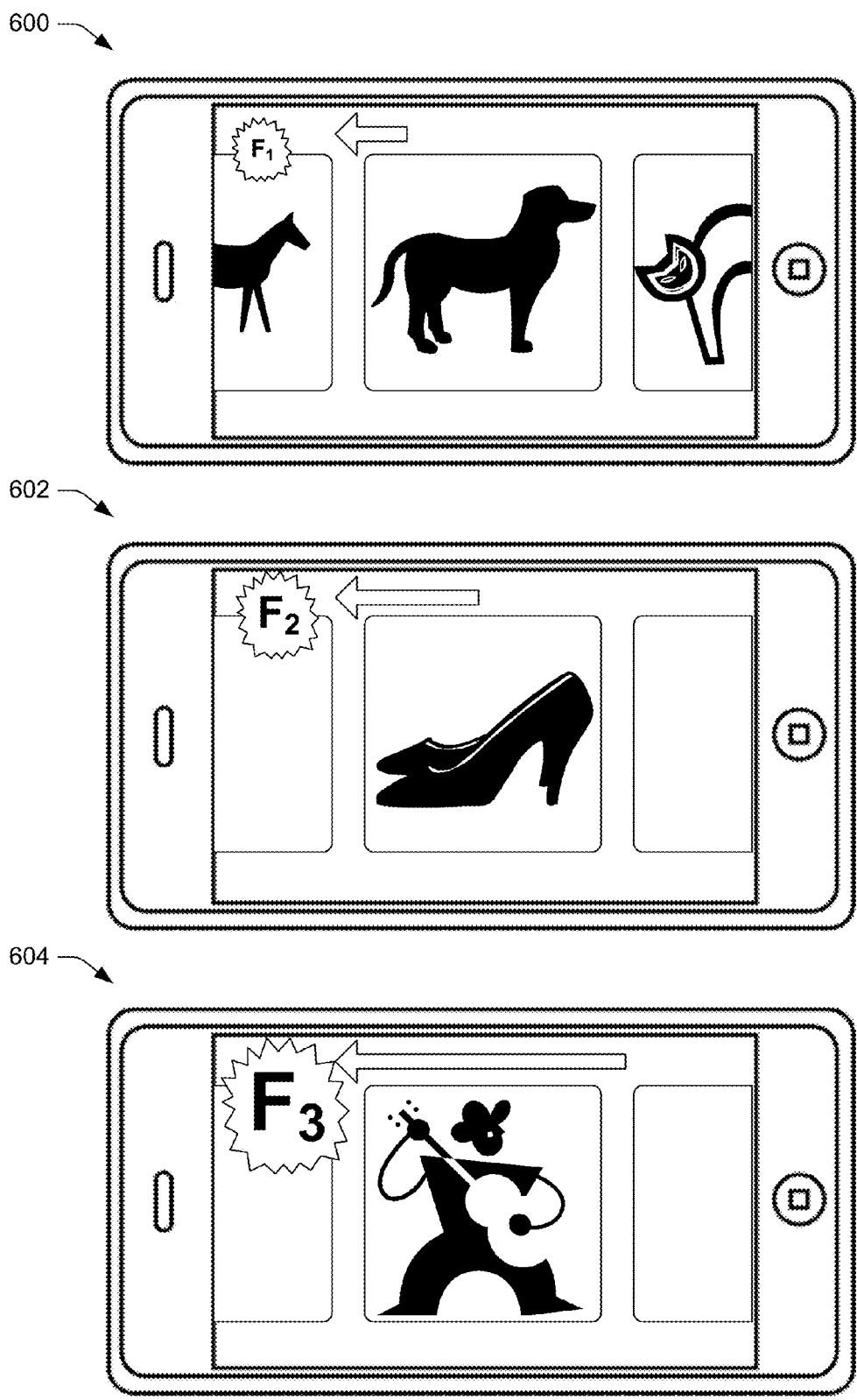
FIG. 6 illustrates three example user interfaces showing photographs, articles of apparel, and music album covers. Here, the force of a touch on the force-sensitive touch-screen of the device controls a speed and direction of scrolling through the displayed items.

FIG. 6 illustrates example user interfaces 600, 602, and 604 rendered by the electronic device 100. Each of the user interfaces 600, 602, and 604 shows the device 100 in a horizontal orientation displaying a content item. As discussed above, the orientation is arbitrary and discussions in this disclosure apply equally to the device 100 in any orientation. In this example, the force-sensitive touch sensor 218 is combined with the display 216 in a force-sensitive touch-screen display. However the same functionality and user interface may be achieved with a separate display 216 and sensor 218.

Each of the content items displayed in the user interfaces 600, 602, and 604 may be a part of an ordered list of content items. The ordering may be manually designated by a user or automatically assigned based on a characteristic of the content items. For example, content items may be ordered alphabetically, numerically, by date of creation, by file size, by a popularity ranking, by a frequency of user access, or by any other metric.

In the first user interface 600 the displayed content item is a photograph of a dog and the ordered series of content items is a plurality of photographs. Here, the photographs may be images of animals such as a horse, a dog, and a cat. The photographs may have been taken by a camera in the device 100 and/or obtained elsewhere and the device 100 may provide an interface to view the photographs.

Assuming that the order of the photographs is presented in the user interface 600 from left to right, the photograph of the horse comes before the photograph of the dog and the photograph of the cat comes after the dog. In this example, a portion of the previous photograph (i.e., the horse) and the subsequent photograph (i.e., the cat) are displayed together with the photograph of the dog. However, the previous and subsequent content items may be excluded from the display so that only one content item (e.g. the photograph of the dog) is presented on the display at a time.

Application of force on the force-sensitive touch-screen display causes the device 102 change the displayed content item. The force may be interpreted by a component of the device 100 such as the vector generation module 208 as a vector having a direction and a magnitude. Here, the application of force is applied to the upper left corner of the force-sensitive touch-screen display and this may be interpreted as a vector direction pointing to the "left" as discussed in FIGS. 3 and 4. Conversely, the user may slide his or her finger to the left. In response to this type of input, a component of the device 100, such as the content item browsing module 104, may cause the displayed photograph to change based on the vector. Here, the vector with a "leftward" direction may be interpreted as a signal to display the next photograph (i.e., the cat). If the user were to apply force to a point on the right-hand side of the force-sensitive touch-screen display, assuming the reference location 308 is located approximately in the center of the display, the previous photograph (i.e., the horse) would be displayed. Again, the user could alternatively or additionally slide his or her finger to the right in some instances to cause display of the previous photograph.

If the amount of force applied is relatively small (e.g., $F_1$) the content item browsing module 104 may cause the display to advance relatively slowly to the next content item (i.e., the cat) at a speed that is proportional to the amount of force. The display may continue to advance to show subsequent content items so long as the user maintains the pressure on the force-sensitive touch-screen display. The speed of scrolling through the content items may be adjusted by the user by pressing harder or softer while the content items are scrolling across the display. Thus, as the user scrolls from one content item to another content item each intervening content item between the content item and the other content item in the ordered series of content items may be displayed. In other words, during the transition from one photograph to another photograph, each intervening photograph is presented on the display.

The second user interface 602 displays an article of apparel, in this example shoes, and the device 100 may cause to the displayed article of apparel to change based on the vector determined from the user touch on the force-sensitive touch-screen display. Here, the level of applied force (e.g., $F_2$) is greater than the force applied in the user interface 600 above. With a greater level of force, the vector is interpreted as having a greater magnitude, and thus, the scroll speed may increase proportionally to the increase in force.

The increase may be directly proportional such that a force of 0.4 N causes the scroll speed to double versus of force of 0.2 N. However, the proportionality between the amount of applied force and scroll speed may have a relationship other than a direct proportionality. For example, there may be a logarithmic or other type of relationship between force and scroll speed. In some implementations, the nature of the relationship between force and scroll speed may be customized by the user.

Similar to the touch shown in user interface 600, the touch shown on the user interface 602 is in the upper left-hand corner of the display. This touch may cause the device 102 scroll to a next article of apparel. All of the articles of apparel in the ordered series of content items may be related articles of apparel. For example, the articles of apparel may be shoes and the ordering applied to this list of content items may be price. Therefore, displaying a next content item shows another pair of shoes that is higher-priced then the high heels shown in the user interface 602.

The ordered series of content items may have multiple dimensions or characteristics by which the series is ordered. For example, there may be an ordering by price and an ordering by material or color (e.g. black leather, brown leather, fabric, vinyl, etc.). A vector generated by the vector generation module 208 may cause the content item browsing module 104 to move through the ordered list of content items by one characteristic or another depending on the direction of the vector. For example, a vector interpreted as pointing to the "left" or "right" may advance backwards or forwards through the articles of clothing based on price. Then, if the user identifies a pair of shoes that she or he likes, the user may view those shoes made of different materials by scrolling "up" or "down" by pressing on the force-sensitive touch-screen display to create a generally "upward-pointing" or generally "downward-pointing" vector.

The order may also be applied in reverse. First the user may scroll through the series of content items to select a type of material (e.g., brown leather) and then scroll through a series of brown leather shoes to find a pair at a price point that he or she desires. The vector directions may be interpreted to allow scrolling through more than two dimensions. Moreover, applications of lists having multiple orderings or dimensions are also applicable to content items other than articles of clothing.

The third user interface 604 shows an album cover associated with a song and the ordered series of content items may include a plurality of songs. The plurality of songs may all share a common feature such as being from the same artist, of a same genre of music, or being in included in a playlist. For some types of content items such as photographs, the item itself may be displayed on the display. However, for content items in other formats such as audio or video content items a graphical representation of the corresponding audio, video, or audio/video file may be shown on the display. Scrolling through the representations of a different audio, video, or audio/video files may be based on a vector generated by the vector generation module 208 along the lines described for the user interfaces 600 and 602 above.

The amount of force (e.g., $F_3$) applied to the user interface 604 is greater than the amount of force applied in either of the user interfaces 600 and 602 above. The larger magnitude of force creates a vector with a greater magnitude and in turn the content item browsing module 104 causes the display to scroll through the content items at a higher rate. As the speed of the scrolling increases, displaying each intervening content item (or representation thereof) may not provide a satisfactory user experience. Each content item may be displayed for too brief a period of time for the user to recognize the content item. The content items may also blur together depending on the speed of the scrolling and the refresh rate of the display. At high scroll speeds (i.e., when the amount of force applied by the user exceeds a threshold level and/or when the scroll speed exceeds a threshold speed) the device 100 may show an abbreviated representation of the intervening content items or may show only a selected subset of the intervening content items. Although each intervening content item is not displayed, what is displayed provides the user with useful information about the corresponding subset of content items. User interfaces and techniques for generating displays when the scrolling speed is high are discussed below in conjunction with FIGS. 8-10.

Figure 7:
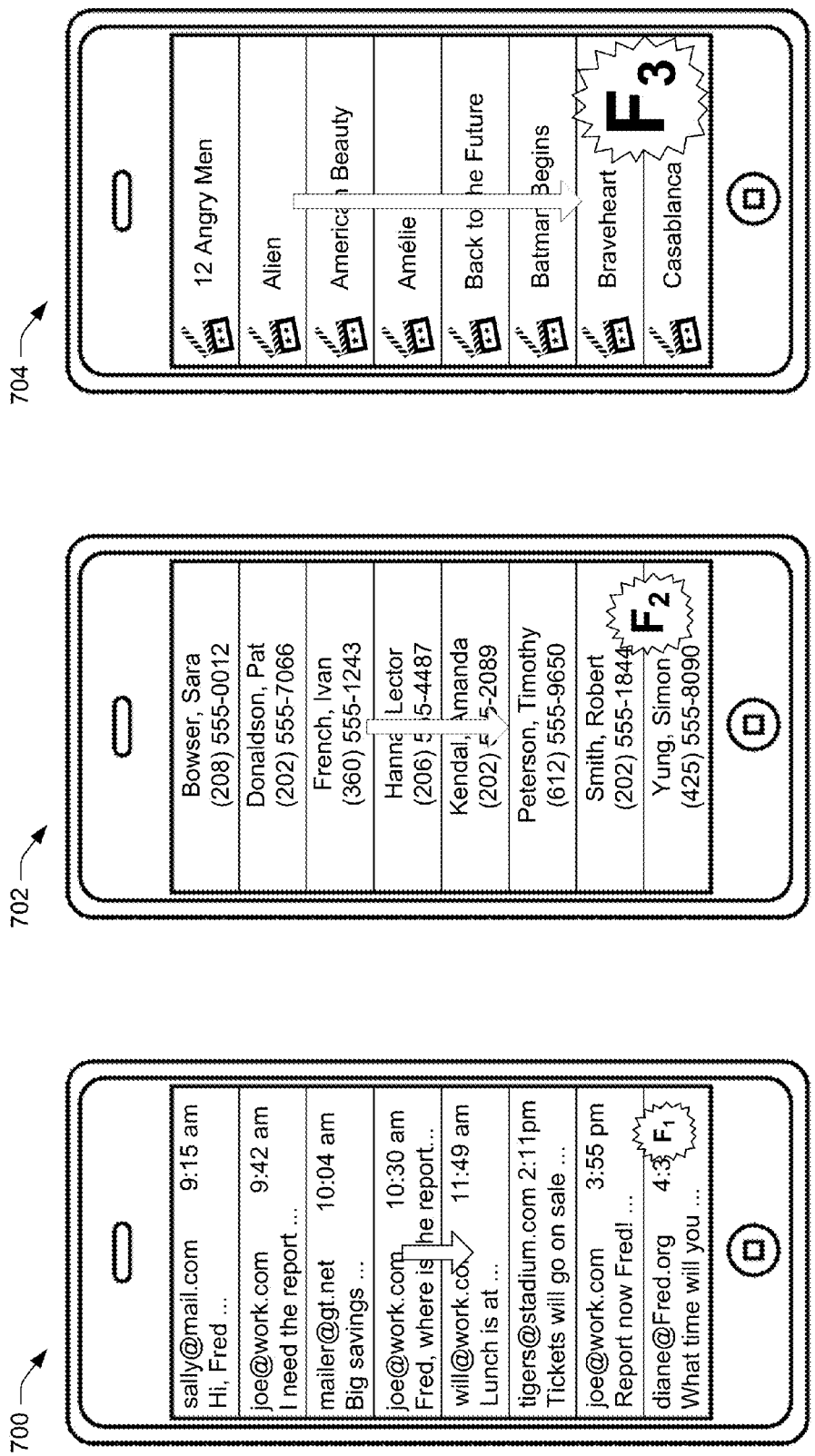
FIG. 7 illustrates another user interface showing e-mail messages, entries in a contact list, and lists of movies. Here, the force of a touch on the force-sensitive touch-screen of the device also controls a speed and direction of scrolling through the displayed items.

FIG. 7 illustrates additional example user interfaces rendered by the electronic device 100. The user interfaces 700, 702, and 704 each display a list of content items when the device 100 is in a vertical orientation. However, the user interfaces 700, 702, and 704 shown in FIG. 7 may also be presented in other orientations and on any other types of display.

In the first user interface 700, the displayed content item is an electronic communication and the list of content items is a series of electronic communications. Electronic communications may include "instant" messages, text messages, SMS messages, "tweets," RSS feeds, and the like. In this context, changing the output on the display of the device causes a previous or subsequent e-mail message to be displayed. In the illustrative user interface 700 shown here, summary information of e-mail messages from a longer list of e-mail messages are displayed. However, it is also possible for only a single message to be displayed at a time. The display may change based on a vector generated by the vector generation module 208. In this example, the user applies force on the lower right-hand corner of the force-sensitive touch-screen display and subsequent e-mail messages are displayed as the list of e-mail messages scrolls down. As with the other list of content items, the e-mail messages may be ordered by any characteristic. Here, that characteristic is the time an e-mail message was received. If the force is below a threshold (e.g., $F_1$) the rate of scrolling down may be relatively slow and each individual e-mail message may appear on the display.

The second user interface 702 shows a several contact list entries and the ordered series of content items comprises names and associated contact information. If the user desires to see more information about each entry in the contact list than just a name and phone number, the user may change the user interface so that one entry is displayed on the screen at a time, and thus, other information such as mailing address, e-mail address, birth date, and such may also be displayed. In this example, the contact list is in alphabetical order by last name. Touching the force-sensitive touch-screen display so that the vector generation module 208 generates a "downwardly" pointing vector may cause the contact listed to advance "down" to an entry that comes later in the alphabet. If the user presses on the force-sensitive touch-screen display with an intermediate level of force that is above a first threshold but below a second threshold (e.g., $F_2$) the rate of scrolling may be at an intermediate speed.

In the third user interface 704, the titles of several movies are shown in alphabetical order. These entries may represent audio/video files that the user can access and consume on the device 100. The user may be searching for a movie titled "Zoolander" and wish to scroll rapidly to the end of the list of movies. Here, the user may apply a greater amount of force (e.g., $F_3$) than is shown in the first or second user interfaces 700 and 702. This greater amount of force may exceed a force threshold and cause the display to scroll through the movie titles at a high speed.

The correlation between the speed of scrolling through a list of content items and the amount of force applied to a force-sensitive touch sensor may be based on discrete force thresholds. For example, the touch with an amount of force less than 0.2 N force threshold may be correlated with a scroll speed of one new list entry appearing on the display every 0.1 seconds (e.g., user interface 700). Above the first threshold of 0.2 N but below a second threshold of 0.5 N, one new list entry may appear on the display every 0.05 seconds (e.g., user interface 702). Once the amount of applied force exceeds the second threshold of 0.5 N, the scroll speed may accelerate to 10 new list entries appearing on the display every 0.1 seconds (e.g., user interface 704). However, in other implementations such as that shown in FIG. 6, the scroll speed may be continuously variable in proportion to the amount of force applied to the force-sensitive touch sensor.

Figure 8:
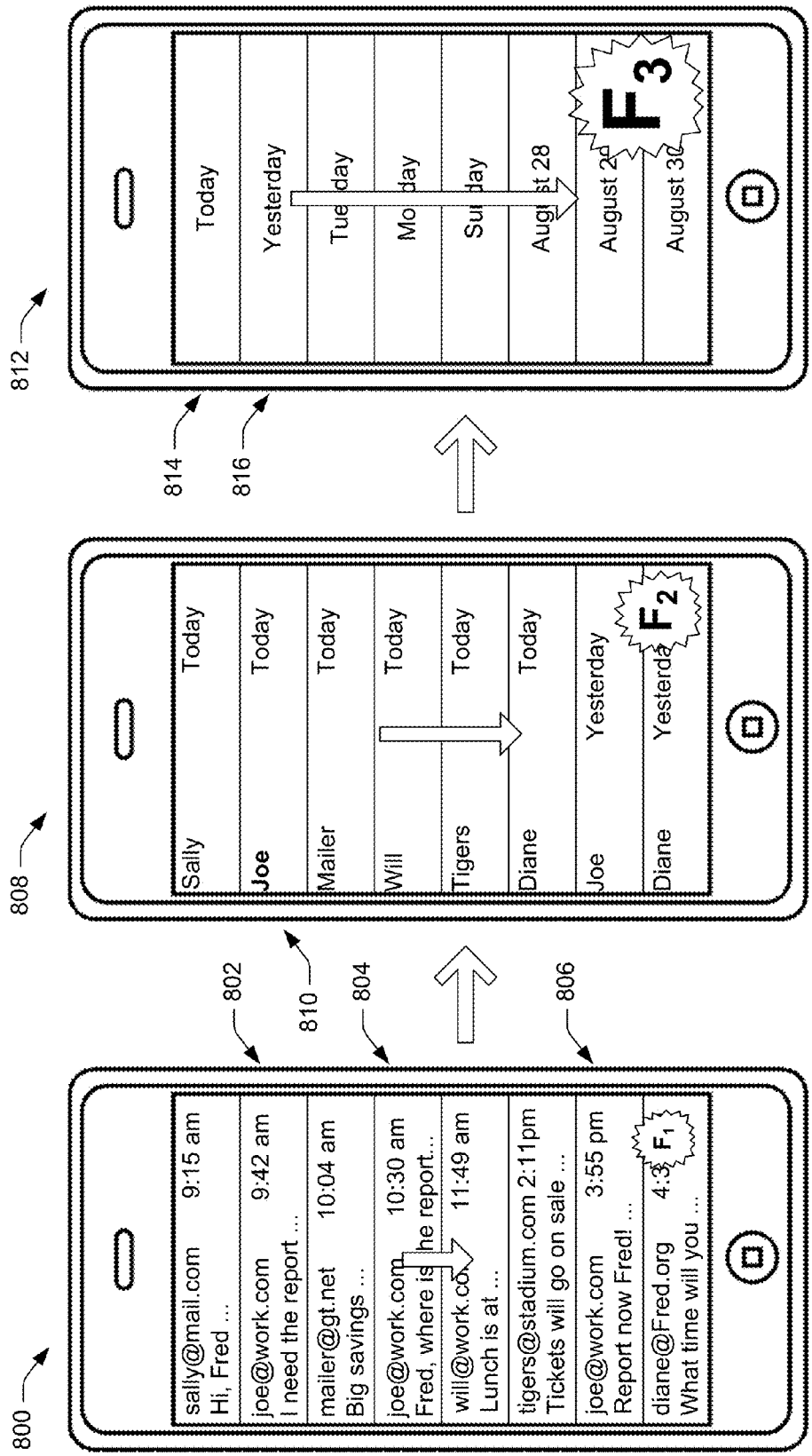
FIG. 8 illustrates a user interface showing how items having a shared characteristic are collapsed into a single item as a speed of scrolling through a list of items increases. Here, the list of e-mail messages of FIG. 7 is collapsed to show only one entry for each unique sender per day after the speed of scrolling exceeds a first threshold. The list is further collapsed to show only one unique entry for each day that an e-mail message was received after the speed of scrolling exceeds a second threshold.

FIG. 8 illustrates the e-mail list shown in user interface 700 with collapsed versions of the e-mail list displayed at faster scroll speeds. The first user interface 800 shows a relatively small magnitude of force (e.g., $F_1$) and a correspondingly slow rate of scrolling. In this user interface 800, a summary of every e-mail message may be displayed. In this illustrative list of e-mail messages, there are three messages 802, 804, and 806 from joe@work.com. The user interface 800 shown here displays summaries of eight e-mail messages, but the user may have many tens or hundreds of e-mail messages in his or her inbox. Accordingly, the relatively slow rate of scrolling may become tedious when browsing through many e-mail messages or other content items.

The second user interface 808 shows illustrative results of the content item browsing module 104 generating a collapsed list of intervening content items for displayed during a transition from one content item to another content item. This user interface 808 shows only a sender's first name and the day on which the e-mail message was received. This collapsed list may show content items with a similar characteristic as a single entry in the collapsed list. For example, the e-mail messages from "Joe" 802, 804, and 806 may be merged into a single entry 810. Thus in this example, the name of a sender (e.g., "Joe") is used to replace several content items shown in the user interface 800.

This feature may be implemented upon the applied force (e.g., $F_2$) or scroll speed exceeding a threshold. Rather than having a summary of each e-mail message as shown in the user interface 800 move across the display very quickly, a compressed list having fewer entries may scroll across the display at a slower speed. In this example, the user may be searching for a particular e-mail message and there may be certain senders that generate many messages each day (e.g., "Joe") therefore rather than showing each of Joe's e-mail messages showing only one entry for all of Joe's messages during a given day can provide meaningful information to the user and allow the user to browse through the list of e-mail messages quickly. In some implementations, names of senders who generated multiple e-mail messages may be shown in bold or in a larger font size. Sender name is but one example of many; other characteristics by which e-mail items could be grouped together include origin domain (e.g., all e-mails from work.com are grouped together). For other types of content items, different features may be used to generate a compressed list such as genre for list of music, e-books, movies, and other media items.

However, depending on the numerosity of content items in a list and the speed at which the user wishes to scroll through that list an even greater level of compression or abbreviation of entries in the list may be useful. The third user interface 812 shows the previous user interface 808 compressed even further displaying only the days on which e-mail messages were received. The e-mails messages from "today" 814 are reduced to a single entry in the user interface 812 as are the e-mail messages from "yesterday" 816 and earlier dates. This greater level of list abbreviation may be due to a greater force (e.g., of $F_3$) applied to the force-sensitive touch sensor that results in an even higher rate of scrolling. Further levels of list compression or abbreviation are also possible. The threshold of force and/or speed at which the displayed list of content items changes to a user interface showing a collapsed version of the list may be designated by the user based on his or her preferences and ability to read items rapidly scrolling across the display.

Figure 9:
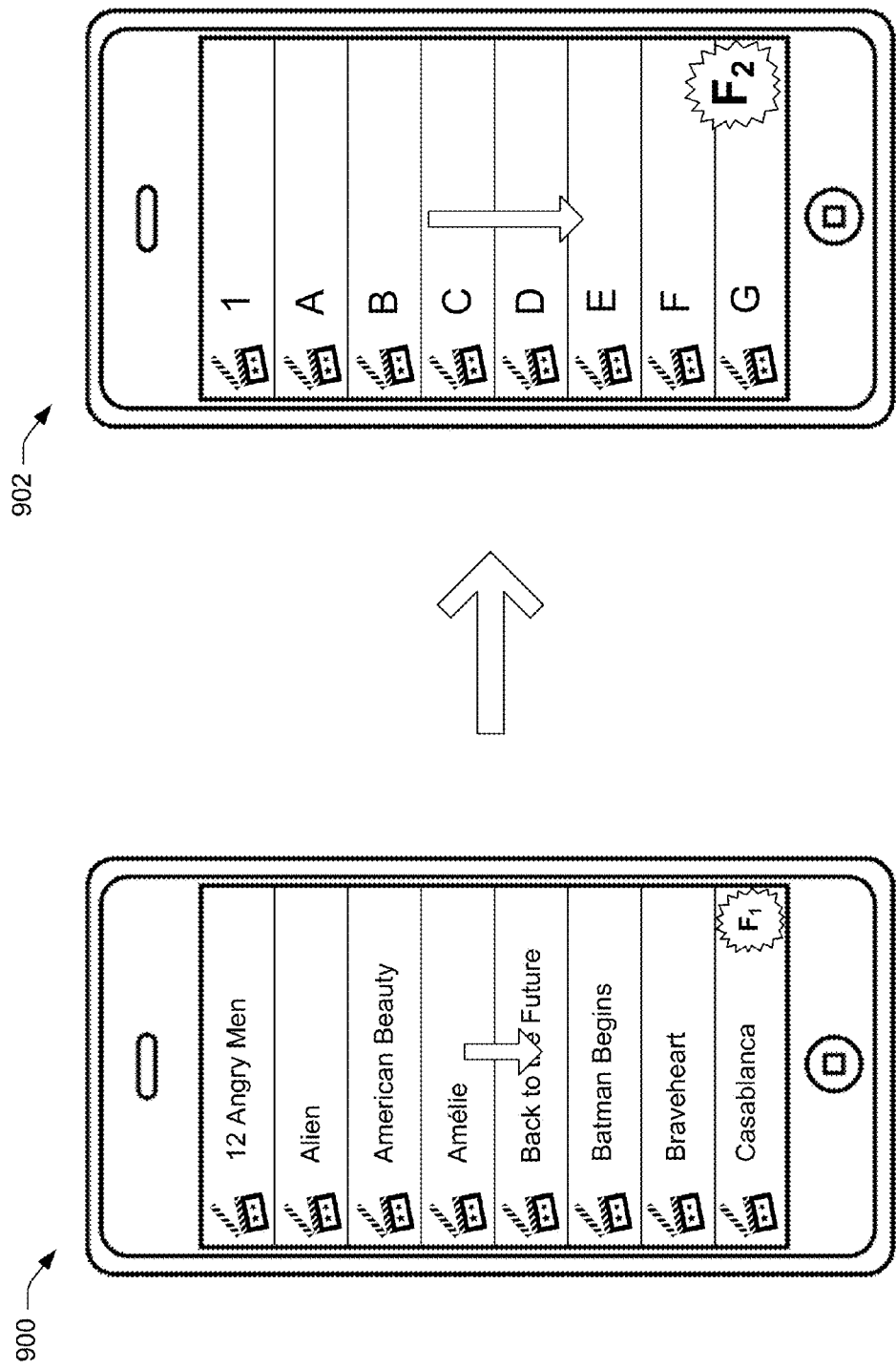
FIG. 9 illustrates another user interface showing an abbreviated representation of content items when the speed of scrolling exceeds a threshold. Here, the list of movies of FIG. 7 is replaced by a list showing only the first letter of a movie title.

FIG. 9 illustrates the list of movies shown in user interface 704 of FIG. 7 presented as an abbreviated representation when the list is viewed at a fast scroll speed. The first user interface 900 shows the list of movies being scrolled through at a relatively slow speed due to the lower level of force (e.g., $F_1$) applied to the force-sensitive touch-screen display. Once the speed of scrolling exceeds a threshold level the user interface 900 may change to the second user interface 902. During scrolling when there is a greater amount of force (e.g., $F_2$) applied that causes a faster scroll speed, the content item browsing module 104 may cause a representative image to be displayed on the display during a transition from displaying a first content item to displaying a second content item. The representative image may represent intervening content items between the first content item and the second content item in the ordered series of content items. For example, the first content item may be an entry for the movie titled "12 Angry Men" and the second content item may be the entry for the movie "Zoolander." The intervening content items would be the entries for all the movies that fall between these two movies in alphabetical order. In the second user interface 902, the representative image is a first letter or number of an attribute (e.g., the title) associated with the intervening content items. For example, instead of showing "Alien," "American Beauty," and "Amélie" the user interface 902 displays the first letter of those movies titles: "A". Using the first letter or number as a representative image for items in the list may be applied to any type of textual entry such as movie titles, song titles, book titles, filenames, names of people in a contact list, etc.

Figure 10:
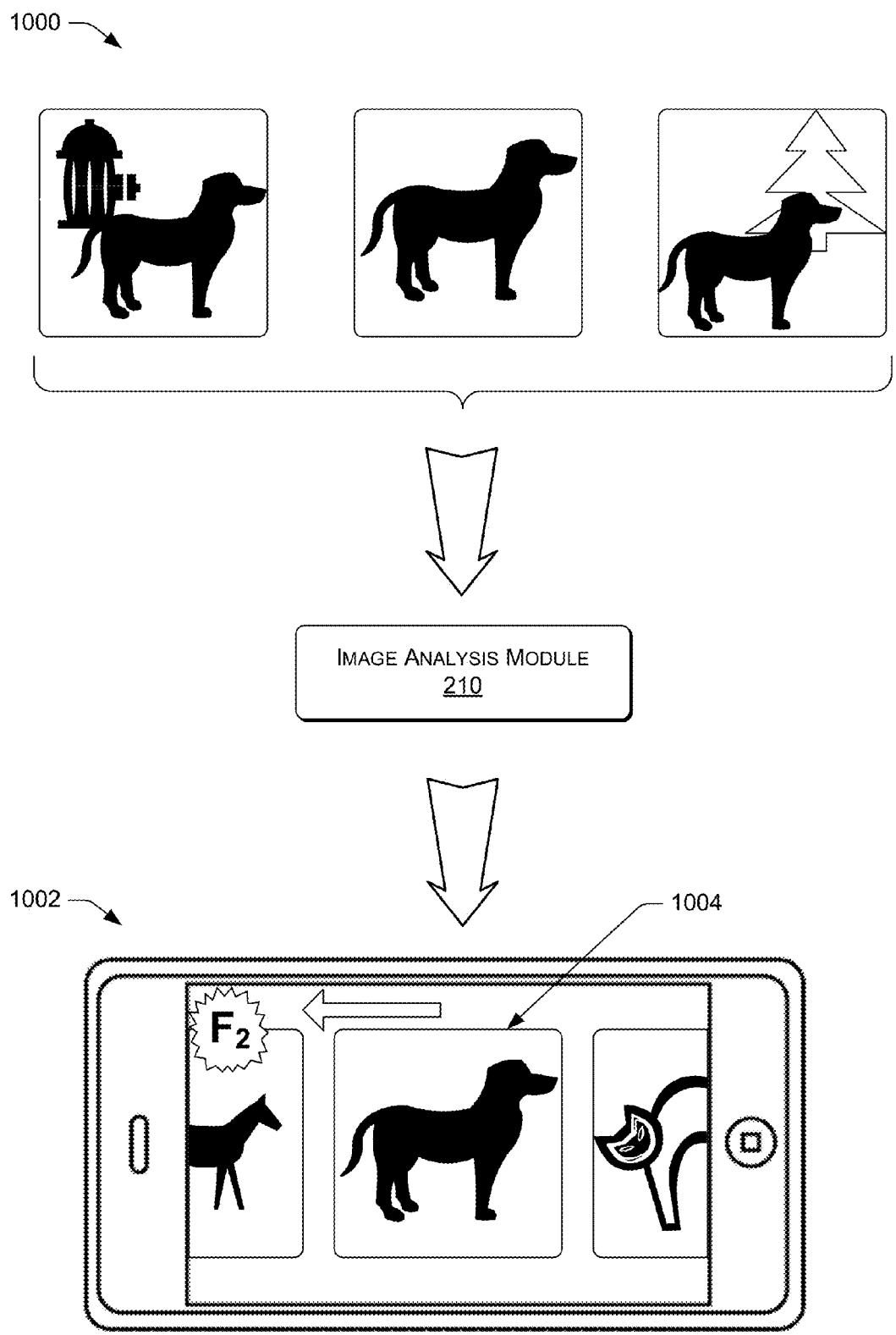
FIG. 10 illustrates selection of a photograph to represent a group of photographs. Here, the image analysis module of FIG. 2 selects a representative photograph from several photographs of a dog. While scrolling through the photographs, the representative photograph rather than each separate photograph is displayed.

FIG. 10 illustrates selection of a representative image by the image analysis module 210 of FIG. 2. For some types of content items, such as photographs, a textual identifier may be absent or fail to describe the content item sufficiently. In such circumstances, the content item browsing module 104 may identify a representative image by image analysis or other techniques. The content items accessible by the device 100 may include several photographs of a dog 1000. When browsing through a large carousel of photographs, several similar photographs may be represented by a representative one of those photographs. The selection of the representative photograph from the plurality of photographs may be performed by the image analysis module 210 shown in FIG. 2. Here, out of the photographs of the dog with a fire hydrant, the dog alone, and the dog with a tree, the image analysis module 210 selects the photograph of the dog alone as a representative image for all of the photographs of the dog 1000.

The user interface 1002 is similar to the user interface 600 shown in FIG. 6. In the user interface 1002, the user is applying a moderate amount of force (e.g., $F_2$) to the upper left corner of the display causing the photographs to scroll across display at a speed such that showing each intervening photograph individually would be difficult for the user to view. Therefore, while the display transitions between one photograph and another the representative photographs selected by the image analysis module 210 are scrolled across the display. Here, the multiple photographs of the dog 1000 are represented on the user interface 1002 as a single representative image 1004 of the dog. The representative image may be displayed when the amount of force detected by the force-sensitive touch sensor exceeds a threshold. When the threshold of force, or scrolling speed, is exceeded the content item browsing module 104 may request identification of a representative image from the image analysis module 210.

In the user interface 1002, the previous photograph of the horse may also be a representative photograph selected from several horse photographs. Similarly, the subsequent photograph of the cat may be another representative photograph as determined by the image analysis module 210. By providing representative photographs to view while scrolling at higher speeds, the user can see generally which types of photographs he or she is scrolling through and reduce the scrolling speed when states that a representative photograph of interest is displayed.

Figure 11:
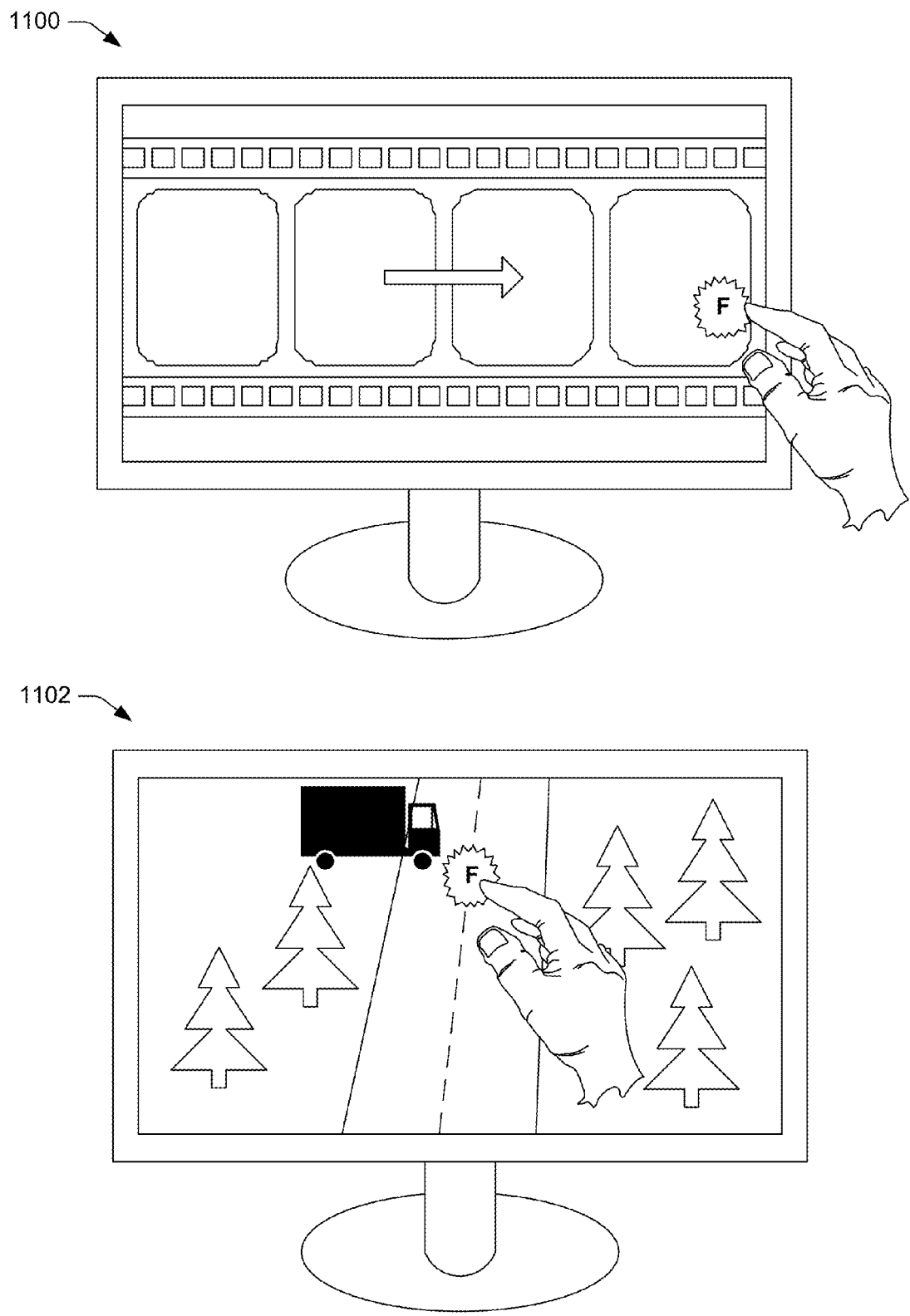
FIG. 11 illustrates an electronic device implemented, at least in part, as a monitor. The monitor displays presents a user interface for a video editing program and a different user interface for a videogame. Here, the user controls a speed and direction of advancing through the frames of video in the video editing program by touching a force-sensitive touch-screen of the monitor. The user also controls the speed and direction of movement in a videogame by touching the monitor.

FIG. 11 illustrates an electronic device that displays output on a desktop monitor. Although the form factor is different, this device may otherwise be analogous to the electronic device 100 shown in FIGS. 1 and 2. The monitor may have a force-sensitive touch-screen display capable of detecting an amount of force applied by the user pressing on the display. The first user interface 1100 shows the user interacting with video editing software. The content displayed on a monitor can change by changing the displayed frame of a video displayed in the video editor. By generating force on the screen that creates a vector which points to the right (in this orientation) the video editing software may advance to show later frames of the video. The speed at which the video advances to later frames may be controlled by the amount of force applied to the force-sensitive touch-screen display. A vector that points generally to the left may be interpreted as a command to move backwards along the timeline of the video and show earlier frames. By allowing the continual, smooth adjustment of the speed at which frames of the video are scrolled across the monitor a more precise level of speed control is allowed then by video editing software that advances the frames only at discrete speeds such as 1×, 2×, 4×, 8×, 16×, etc. these techniques are discussed in the context of video editing software, but a similar user interface may be adapted for fast forwarding or rewinding while viewing a movie or other video content.

The video editing software, or another type of software, may also include a color editing functionality. A user interface for color editing may includes multiple colors (e.g., red, green, and blue; red, yellow, and blue; or an entire color wheel) from which the user can generate a custom color. The colors and specific mix may be controlled by user input on a force-sensitive touch sensor. For example a location of a touch may control the color mix and a force of the touch may control a saturation or intensity of the color. Alternatively, a location may control the ratio of two colors in the mix (e.g., red and green) and a force applied to the force-sensitive touch sensor may control the amount of a third color (e.g., blue) added to the color mix.

The second user interface 1102 shows the user interacting with the video game using location and force of touch. The changing content displayed on the monitor may comprise changing scenes in the video game. In this example, the magnitude of force applied to the force-sensitive touch-screen display may control a speed of movement of a character and the direction of the vector created by the touch may indicate a direction of movement. The vectors detected by the vector generation module 208 may provide user input that can be adapted for many types of video games. Here, the magnitude and direction of the vector control the movement of a vehicle along a road. In other games, the direction of the vector may control a direction or angle of a swing and the magnitude of the vector may control how hard the user hits a ball. Further differentiation between user inputs may be accomplished by assigning different functions to touches created by different numbers of fingers (e.g., one, two, three, etc. finger touches). For example, varying a number of fingers touching the monitor may cause a swing in a golf game to slice or hook.

Figure 12:
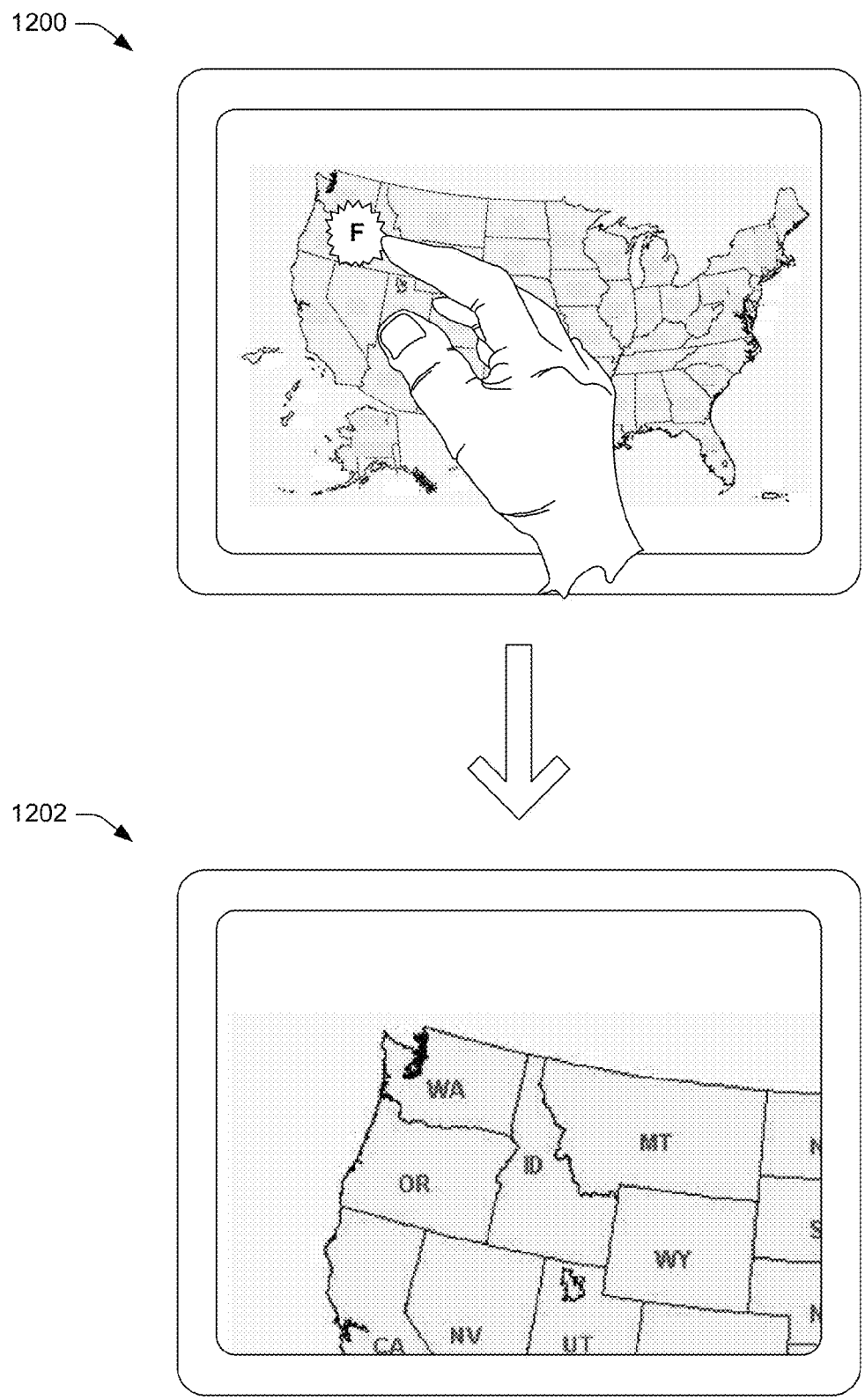
FIG. 12 illustrates a user interface showing the display of the device "zooming in" or magnifying a portion of a document. Here, the user touches a portion of a map displayed on the display and the device magnifies the map in proportion to the amount of force.
Figure 13:
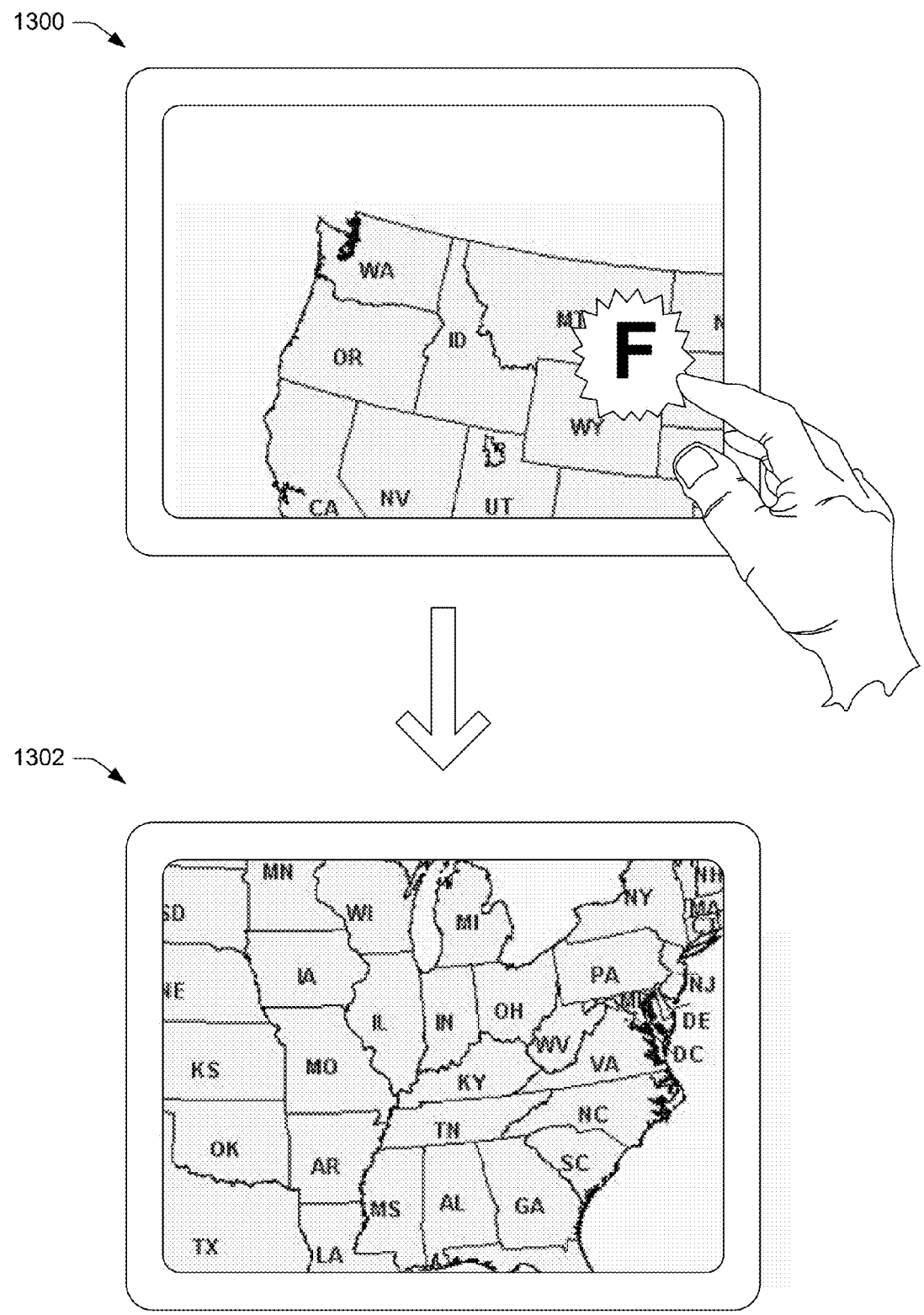
FIG. 13 illustrates another user interface showing the display of the device panning from one portion of a document to another portion of the document. Here, the user touches the portion of a map of the United States and the device pans or scrolls the display to show a different portion of the map of the United States.

FIG. 12 illustrates the tablet device 500 of FIG. 5 displaying a user interface 1200 that shows a document. In this example, the document is a map of the United States; however, the examples provided in connection with FIGS. 12 and 13 are equally applicable to other types of documents such as electronic books, text files, spreadsheet documents, documents in Adobe® portable document format (PDF), etc. The user may change the content displayed on the tablet device 500 by touching a force-sensitive touch sensor. The force-sensitive touch sensor may be located on the display as a combined force-sensitive touch-screen display or on any other surface of the tablet device 500 such as the back or the side.

The force input on a force-sensitive touch sensor may cause the tablet device change the displayed portion of the map. Changing the displayed portion of the map may include presenting a portion of the map at a different magnification. For example, the user interface 1200 shows the user touching a portion of the map and the next user interface 1202 shows a magnified view of the map. In one implementation, the magnitude of force of the touch corresponds to a speed of change of magnification. A more forceful touch may cause the device to zoom in on a portion of the map rapidly and a softer touch may cause the device to zoom in slowly. The user may adjust the rate of magnification change by adjusting the amount of force he or she applies to the force-sensitive touch sensor.

The user may also return to a previous view by undoing the zoom command. A region of the force-sensitive touch sensor may be configured to act as an "undo" button when touched. Additionally or alternatively, a tap (e.g. a short application of force to an area of the force-sensitive touch sensor) may return the display of the map to the previous level of magnification thus undoing a most recent zoom command.

The user may also decrease the magnification or zoom out to see a larger area of the map. Thus, the input generated by the user communicates a rate of magnification change and a direction of change (e.g., increase or decrease in magnification). In one implementation, pressing on a defined region of a force-sensitive touch-screen display may indicate that the direction of change is an increase in magnification and pressing on a different region may indicate a decrease in magnification. For example, the zoom in/zoom out regions may be the top and bottom, left and right, or any other regions of the force-sensitive touch-screen display. The zoom in and zoom out regions may be configured so that one hand (e.g., the left) can conveniently generate a zoom in command and the other hand (e.g., the right) can conveniently generate a zoom out command.

In another implementation, a touch on one touch sensor may be interpreted as a command to increase the magnification and a touch on a separate touch sensor may be interpreted as this command to decrease the magnification. For example, a touch on a sensor located on the left side of the device may signal increase in magnification and touch on sensor on the right side of the device may signal decrease in magnification. As a further example, a touch on the force-sensitive touch-screen display on the front of the device may cause the device to zoom in and a touch on a force-sensitive touch sensor located on the back of the device may cause the device to zoom out.

An additional example of user inputs for differentiating between increase and decrease magnification commands may be differentiating between a number of fingers touching the force-sensitive touch sensor. A single finger touch may be interpreted as a command to increase magnification and a multi-finger touch may be interpreted as a command to decrease magnification. For example, the user may press on the force-sensitive touch-screen display as shown in the user interface 1200 with a single finger to magnify the document. If the user is viewing the user interface 1202 and wishes to zoom out to a wider view of the document, the user may touch the display with two fingers. When using either one or two fingers, the force of the touch may control how rapidly the magnification of the document changes. A further example includes a brief tap followed by steady force applied by a finger or fingers. Here, the brief tap may toggle between zooming in and zooming out when the steady force is applied to the force-sensitive touch sensor.

FIG. 13 illustrates a user interface 1300 of the tablet device 500 of FIG. 5 displaying the map of FIG. 12. When reviewing a document, the user may wish to pan or change the displayed portion of the document without changing the magnification. The change between the user interface 1300 and the user interface 1302 shows one example of how force input may cause the device 500 to change the display by panning to a different portion of the map. Here, the user wishes to view a portion of the map which is located to the east and slightly to the south of the portion displayed in the user interface 1300. By applying force to the right and slightly below the center of the force-sensitive touch-screen display the user may signal the direction he or she wishes to pan or scroll the document. The magnitude of the touch may indicate a speed of a panning or scrolling. The direction of the panning and the speed of the panning may be interpreted as a vector by the vector generation module 208.

The user may navigate around the map, or other document, by touching in the direction he or she wishes to move the map and pressing down with varying levels of force to control the speed at which the display pans across the map. In some implementations, the user may use location and force of touch to control both the level of magnification of a document as shown in FIG. 12 and panning over the document. The device may differentiate between magnification inputs and panning inputs by the number of fingers touching the force-sensitive touch sensor. For example, a single finger touch could correlate with a pan command and a multi-finger touch could correlate with a magnification command.

Figure 14:
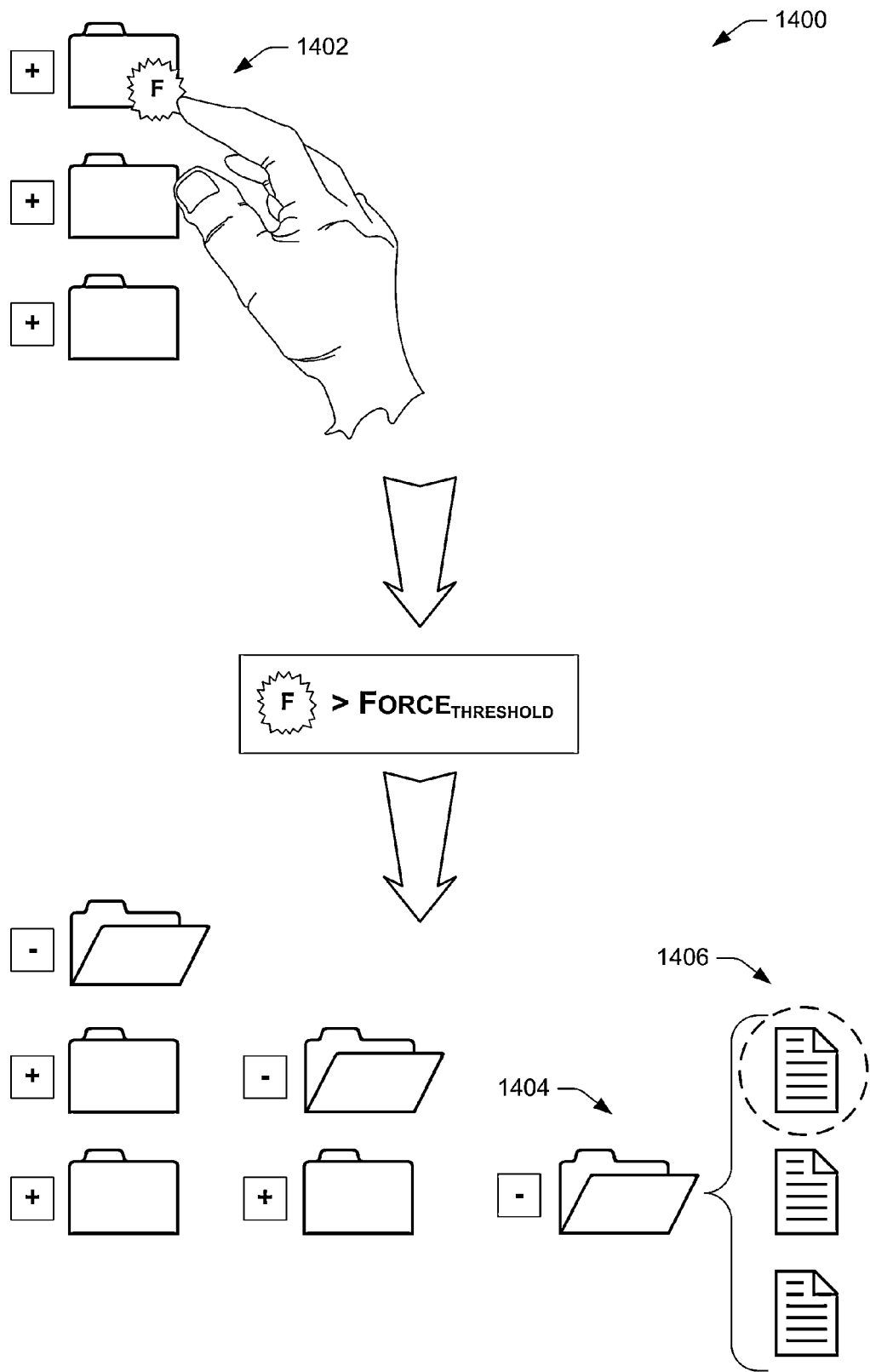
FIG. 14 illustrates a user interface showing a graphical representation of a folder and file hierarchy. In this user interface, the user can quickly drill down to a deepest level subfolder, a most popular subfolder, a most popular document, and the like by pressing on a graphical representation of a folder with force that exceeds a threshold.

FIG. 14 illustrates a user interface 1400 through which a user can navigate a folder and file hierarchy by touching a force-sensitive touch sensor. The user interface 1400 may display multiple folders 4402 that can be "opened" by touching the folder icon on a force-sensitive touch-screen display. In this example folder and file hierarchy, each folder may contain other folders ("subfolders") and/or files (documents, executable applications, etc.). This user interface 1400 may be generated by the directory navigation module 212 shown in FIG. 2.

Various combinations of force levels and numbers of fingers used to touch the folder icon may cause the user interface 1400 to display different contents of the selected folder 1402. In one implementation, touching the folder 1402 ma of the hierarchy y show whatever contents are located directly inside it at the next level. However, there may be situations in which the user frequently navigates through several levels of folders before he or she reaches the file that he or she desires. By detecting and amount of force applied when touching the folder 1402, a device displaying the user interface 1400 may provide a shortcut to popular or frequently accessed contents within the folder 1402.

For example, when the amount of force applied to the force-sensitive touch sensor exceeds a force threshold, that command may be interpreted differently than a softer touch on the folder 1402. This firmer touch that exceeds the force threshold may cause the user interface 1400 to display the contents of a most-frequently accessed subfolder 1404. Doing so may bypass intermediate subfolders and allow the user to more quickly view a folder or file that he or she is likely interested in accessing. It may be presumed that the user is interested in accessing this folder 1404 because it is the most-frequently accessed subfolder of the folder 1402.

Here, the subfolder 1404 contains three files. By changing the user interface 1400 to show the three files, the user may be able to open and interact with the files. In other implementations, pressing on the starting folder 1402 with more than a threshold level of force may cause the user interface 1400 to display the most-frequently accessed file 1406 within the starting folder 1402. Thus, a "hard" press on a folder 1402 may have at least two possible results: displaying the contents of a most popular subfolder or displaying a most popular file within any of the subfolders of the folder 1402. In some implementations, differentiation between these two options may be accomplished by determining a number of fingers used to press on the folder 1402. For example, pressing with one finger and exceeding the force threshold may cause the subfolder 1404 contents to be displayed. Pressing with more than one finger and exceeding the force threshold may cause the most-frequently accessed file 1406 to be displayed.

Illustrative Processes

Figure 15:
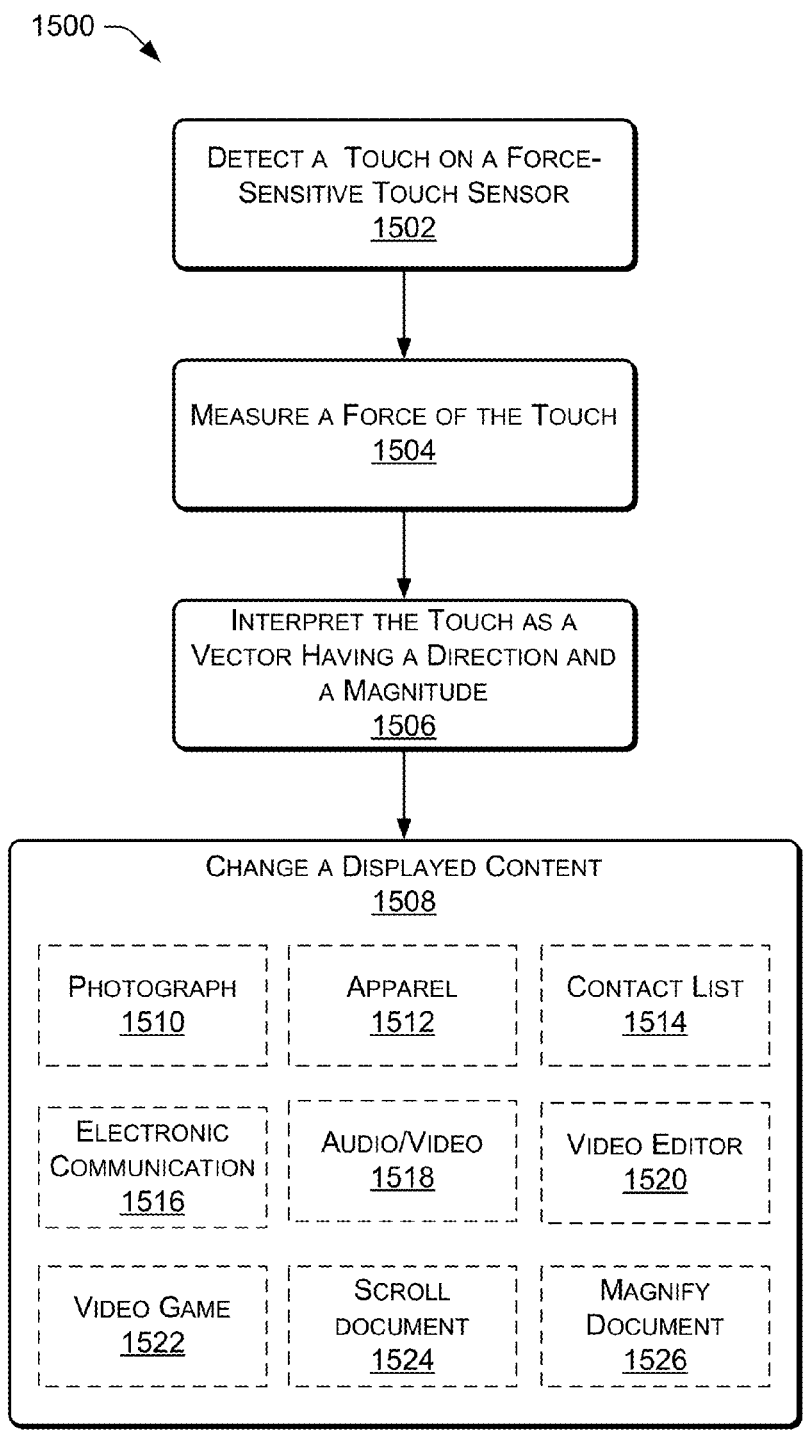
FIG. 15 is a flow diagram showing a process of interpreting a touch on a force-sensitive touch sensor as a vector and changing a content displayed on an electronic device based on the vector.
Figure 16:
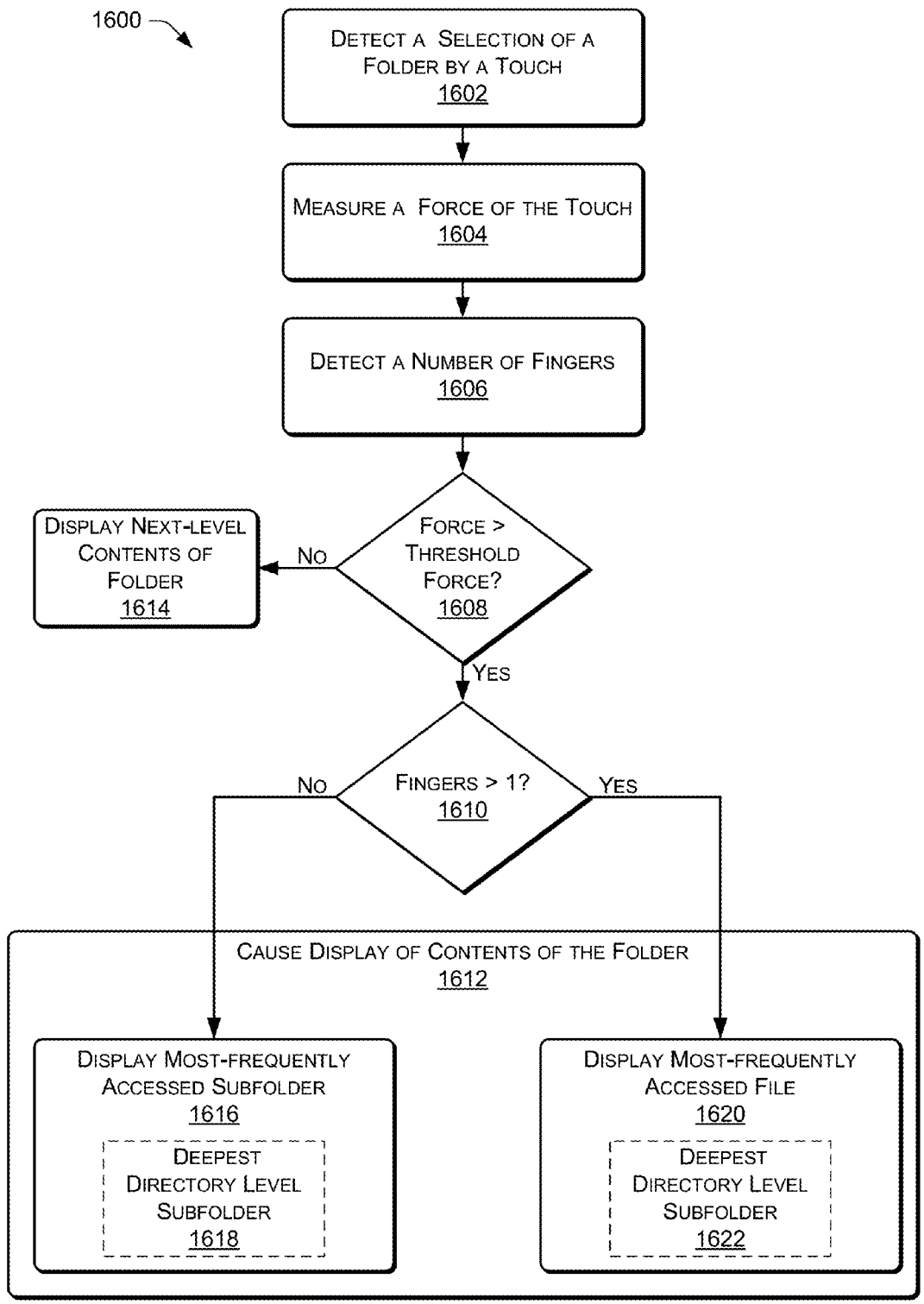
FIG. 16 is a flow diagram showing a process of displaying the content of a folder based on a combination a force of a touch and a number of fingers generating the touch.

FIGS. 15 and 16 illustrate example processes 1500 and 1600 for implementing the techniques described above of using force and touch navigate through user interfaces. The processes are illustrated as logical flow graphs, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 15 illustrates process 1500. Process 1500 includes an operation 1502, which represents detecting touch on a force-sensitive touch sensor. This detecting may be performed by any type of force-sensitive touch sensor such as, for example, an IFSR sensor. The force-sensitive touch sensor may be a stand-alone input device such as a touch tablet connected to an electronic device or a touch surface located on a front, back, or side of the electronic device. In some implementations, the force-sensitive touch sensor may be combined with a display to create a force-sensitive touch-screen display. The user may apply force to the force-sensitive touch sensor with his or her fingers, a stylus, or any other suitable implement.

Operation 1504 represents measuring a force of the touch. While conventional touch sensors may detect the presence of a touch and the location of the touch, force-sensitive touch sensors also determine an amount or magnitude of force applied to the touch sensor. For example, two touches at the same location of the force-sensitive touch sensor may result in different commands being transmitted to the electronic device based on different strength of the touches.

Operation 1506 represents interpreting the touch as a vector having a direction determined at least in part by comparing a location of the touch to a reference location and having a magnitude determined at least in part by the force of the touch. This may include, for example, determining the angle of a line connecting the reference location and the location of the touch in order to determine a direction of the vector. The magnitude of the vector may be determined by applying a conversion factor to the raw force data obtained from the sensor. The conversion may a directly proportional relationship between the amount of force and the vector magnitude (e.g., 0.2 N of force equals a vector with a magnitude of two units and 0.4 N of force equals a vector with a magnitude of four units). The conversion between force and vector magnitude may also be proportional but not directly so (e.g., 0.2 N of force equals a vector with a magnitude of one unit and 0.4 N of force equals a vector with a magnitude of three units).

Operation 1508 represents changing a displayed content based at least in part on the vector. The context and the type of change that is applied to the displayed content may broadly include any type of change that can be initiated through user input to an electronic device.

For example, the displayed content may be a photograph 1510 and the change may be replacing the currently displayed photograph with a different photograph. The displayed content may also be an article of apparel 1512 and the change may be showing a different article of apparel or showing the same article of apparel in a different material. The displayed content item may also be a single entry or several entries in a list such as a contact list 1514. The change may be moving forwards or backwards through the list showing a previous or a subsequent contact. The displayed content may also be one or more electronic communications 1516. The change to this displayed content may be advancing forwards or backwards to other electronic communications in the list. As a further example, the displayed content item may be a title or graphical representation of an audio and/or video 1518 content item. The change in the display may be a representation of a different audio and/or video item in that list. The content item may also be a frame of a video file and the change in the displayed content may be a video editor 1520 changing the selected frame to an earlier or later frame of the video file. Additionally, the content item may be a video game 1522 and the change in the displayed content may be a change to a different scene in the video game based on the direction and magnitude of the vector. The displayed content item may also be a document and the change in the displayed content may be scrolling 1524 up, down, left, right, etc. to a different portion of the document. Similarly the display of the document may be magnified 1526 by either zooming in or zooming out on a portion of the document.

The above examples are but a few of many. Process 1500 is equally applicable to other types of content items and changes to the displayed content.

FIG. 16 illustrates process 1600. Process 1600 includes an operation 1602 which represents detecting a selection of a folder by a touch on a force-sensitive touch sensor. In one implementation, the folder may be displayed on a force-sensitive touch-screen display and the location of touch may be the portion of the display showing the folder icon.

Operations 1604 and 1606 represent measuring a force of the touch on the force-sensitive touch sensor and detecting a number of fingers causing the touch. Measuring the magnitude of applied force and detecting a number of fingers contacting the touch sensor may be accomplished by force-sensitive touch sensors using IFSR technology as well as by other types of touch sensors.

Operation 1608 represents a decision point identifying if the magnitude of force exceeds a force threshold. The threshold may be relative or absolute and based on a preprogrammed level of force or based on a relative amount of force compared to other user touches.

Operation 1610 represents a decision point identifying if one finger or a multiple fingers were used to generate the touch. Although omitted for the sake of simplicity, additional decision points distinguishing between two fingers and three fingers, three fingers and four fingers, etc. may also be included in the process 1600.

Operation 1612 represents causing a display of the contents of the folder identified at operation 1602 based on the force of the touch and/or a number of fingers used to generate the touch. The contents broadly include all the subfolders, at any level, and all of the files contained in those subfolders. If the device implementing the process 1600 recognizes one force threshold and differentiates between one and more than one fingers those two variables create a 2×2 matrix of four different commands that may be generated based on amount of force and number of fingers (i.e., less than the threshold and one finger, less than the threshold and more than one finger, more than the threshold and one finger, and more than the threshold and more than one finger). If two force thresholds are recognized (e.g., leading to three different levels of force) and one, two, and 3+ finger touches are differentiated then that level of input discrimination will result in a 3×3 matrix of nine different commands. Each of the force/finger input combinations may be assigned to a different command related to displaying the contents of the folder. Several illustrative, but non-limiting, commands are described herein.

The process 1600 may proceed from operation 1608 along the "no" path to operation 1614 when the applied force is less than the force threshold. Operation 1614 represents displaying the next-level contents that are contained immediately inside the selected folder. This may be similar to the result achieved by "double-clicking" on a folder in a conventional user interface. In this example, when the applied force is less than the force threshold the number of fingers is not used to further refine the command.

When the force of the touch is greater than the force threshold, process 1600 proceeds from operation 1608 along the "yes" path to operation 1610. If the number of fingers detected is not greater than one (i.e., the user touches the force-sensitive touch sensor with a single finger) the process 1600 proceeds along the "no" path to operation 1616.

Operation 1616 represents displaying a most-frequently accessed subfolder within the folder identified at operation 1602. Thus, rather than having to open multiple folders to access a folder deep within a directory hierarchy, touching the folder icon with an amount of force that exceeds the force threshold may cause a displayed user interface to automatically show the contents of a most-frequently accessed subfolder.

Operation 1618 represents displaying the most-frequently accessed subfolder that exists at a deepest directory level (i.e., there are no other folders within this folder). For example, a most-frequently accessed subfolder that is not at the deepest directory level may only contain other folders, and thus, even if the contents of this folder are displayed the user will still need to open more folders in order to find documents or executable files. In implementations in which touching a folder with a force that exceeds the force threshold results in opening a subfolder at the deepest directory level that is the most-frequently accessed subfolder out of all those subfolders at the deepest directory level, it may be more likely that the user interface will display documents or executable files that the user wishes to access.

When the number of fingers detected at operation 1610 is greater than one, the process 1600 may proceed along the "yes" path to operation 1620.

Operation 1620 represents displaying a most frequent accessed file within the folder (or a subfolder thereof) identified at operation 1602. By changing the display to show the most frequent accessed file, the user may be able to quickly launch or open that file without seeing visual distraction from other files or subfolders that are not frequently accessed.

Operation 1622 represents displaying the most-frequently accessed file that exists within a subfolder at the deepest directory level. Rather than showing the most-frequently accessed file at any level within the folder identified at operation 1602, operation 1622 looks only in those subfolders at the deepest directory level to identify a most-frequently accessed file.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims

What is claimed is:

1. One or more non-transitory computer-readable media storing computer-executable instructions that, when executed, cause one or more processors to perform acts comprising:

detecting a touch on a force-sensitive touch-screen display of an electronic device during display of a content item on the electronic device, the content item belonging to an ordered set of multiple content items;

measuring a force of the touch on the force-sensitive touch-screen display;

interpreting the touch as a vector having (i) a direction determined at least in part by an angle of a line connecting a reference location at the middle of the force-sensitive touch-screen display to a location of the touch, and (ii) a magnitude determined at least in part by the force of the touch;

determining a direction of scrolling through the ordered set of multiple content items based at least in part on the direction of the vector;

determining a scroll rate at which one of the multiple content items displayed on the electronic device is replaced by another of the ordered set of multiple content items, wherein the scroll rate is proportional to the magnitude of the vector; and presenting, during the scrolling, based at least in part on the scroll rate, a collapsed list that comprises an abbreviated representation of at least a portion of the multiple content items, wherein a level of abbreviation of the collapsed list is based at least in part on the magnitude of the vector.

2. One or more non-transitory computer-readable media as recited in claim 1, wherein the force-sensitive touch-screen display comprises an interpolating force-sensitive resistance array.

3. One or more non-transitory computer-readable media as recited in claim 1, wherein the scroll rate is directly proportional to the magnitude of the vector.

4. One or more non-transitory computer-readable media storing computer-executable instructions that, when executed, cause one or more processors to perform acts comprising:

detecting a touch on a force-sensitive touch sensor of an electronic device during display of content on the electronic device, wherein the displayed content comprises a series of content items that comprises at least photographs;

measuring a force of the touch on the force-sensitive touch sensor;

interpreting the touch as a vector having (i) a direction determined at least in part by comparing a location of the touch to a reference location, and (ii) a magnitude determined at least in part by the force of the touch;

changing the displayed content based at least in part on the vector having the direction and the magnitude;

selecting, by an image recognition algorithm from the series of content items, a representative image that is representative of at least a subset of the series of content items; and displaying the representative image on the display during the change, the representative image representing one or more of the content items in the series of content item.

5. One or more non-transitory computer-readable media as recited in claim 4, wherein the force-sensitive touch sensor comprises an interpolating force-sensitive resistance array.

6. One or more non-transitory computer-readable media as recited in claim 4, wherein the force-sensitive touch sensor comprises a touch-screen display that displays the content on the electronic device.

7. One or more non-transitory computer-readable media as recited in claim 4, wherein the direction of the vector is a direction of a line from the reference location to the location of the touch.

8. One or more non-transitory computer-readable media as recited in claim 4, wherein the reference location is the center of the force-sensitive touch sensor.

9. One or more non-transitory computer-readable media as recited in claim 4, wherein the changing the displayed content comprises changing a rate at which the content scrolls across a display of the electronic device, and wherein the rate of the changing the displayed content is proportional to the magnitude of the vector.

10. One or more non-transitory computer-readable media as recited in claim 4, wherein changing the displayed content comprises causing a displayed photograph to change to another photograph based at least in part on the vector.

11. An electronic device, comprising:
one or more processors;
memory coupled to the one or more processors, the memory configured at least in part to store a series of content items;
a force-sensitive touch sensor communicatively coupled to the one or more processors to detect user inputs;
a display communicatively coupled to the one or more processors to display an output; and
a content item browsing module, stored in the memory and executable on the one or more processors to:
receive an indication that the force-sensitive touch sensor has detected a user input having a location and an amount of force;
scroll forwards or backwards through the series of content items, based at least in part upon the location of the user input, at a speed that is based at least in part upon the amount of force of the user input; and
present an abbreviated representation of the series of content items during the scroll forwards or backwards in response to the amount of force exceeding a threshold, wherein a level of abbreviation of the series of content items is based at least in part on the amount of force.

12. The electronic device as recited in claim 11, wherein the force-sensitive touch sensor comprises an interpolating force-sensitive resistance array.

13. The electronic device as recited in claim 11, wherein the display comprises the force-sensitive touch sensor.

14. The electronic device as recited in claim 11, wherein the location of the user input is located at least in part on a side or a back of the electronic device.

15. The electronic device as recited in claim 11, wherein the series of content items comprises a plurality of photographs.

16. The electronic device as recited in claim 11, wherein the series of content items comprises a plurality of audio or video files.

17. The electronic device as recited in claim 11, wherein the series of content items comprises a plurality of related electronic communication.

18. The electronic device as recited in claim 11, wherein the series of content items comprises names and associated contact information.

19. The electronic device as recited in claim 11, wherein the content item browsing module is further executable to cause one or more intervening content items in the series of content items to be displayed as the abbreviated representation on the display during the scroll forwards or backwards.

20. The electronic device as recited in claim 11, where in the abbreviated representation presents a plurality of content items with a shared characteristic as a single entry in a collapsed list.

21. The electronic device as recited in claim 20, wherein the series of content items comprises a series of electronic communications and the shared characteristic comprises a name of a sender of the electronic communications.

22. The electronic device as recited in claim 20, wherein the series of content items comprises a series of photographs and the shared characteristic comprises a measure of similarity determined by an image recognition algorithm.

23. A method comprising:
detecting a touch on a force-sensitive touch sensor;
measuring a force of the touch on the force-sensitive touch sensor;

interpreting, by one or more processors, the touch as a vector having a direction and a magnitude;

changing a displayed content based at least in part on the vector, wherein the displayed content comprises one or more items of a series of content items;

selecting a representative image to represent the one or more content items in the series of content items based at least in part on an analysis of at least one of a clarity or a contrast of the one or more content items; and displaying the representative image on the display.

24. The method of claim 23, further comprising determining the direction of the vector at least in part by comparing a location of the touch to a reference location.

25. The method of claim 24, wherein the reference location is a center of the force-sensitive touch sensor.

26. The method of claim 23, further comprising determining the magnitude of the vector based at least in part on the force of the touch.

27. The method of claim 23, wherein the changing the displayed content comprises changing a rate at which the displayed content scrolls across a display of the electronic device, and wherein the rate of the changing the displayed content is proportional to the magnitude of the vector.

28. The method of claim 27, wherein the displayed content comprises one or more items of an ordered series of content items.

29. The method of claim 28, wherein the ordered series of content items comprises at least one of a plurality of photographs, a plurality of audio or video files, entries in a contact list, or electronic communications.

30. One or more computer-readable media as recited in claim 4, wherein the representative image is displayed when the force exceeds a threshold.

31. One or more computer-readable media as recited in claim 4, wherein the representative image comprises a first letter or number of an attribute associated with the one or more of the content items.

32. The electronic device as recited in claim 11, wherein the series of content items comprises a plurality of articles of apparel.

33. The electronic device as recited in claim 11, wherein the series of content items comprises frames of a video.

* * * * *